(12) United States Patent
Hirota et al.

(10) Patent No.: US 7,158,134 B2
(45) Date of Patent: Jan. 2, 2007

(54) IMAGE PROCESSING APPARATUS AND IMAGE PROCESSING METHOD

(75) Inventors: Yoshihiko Hirota, Toyokawa (JP); Keisuke Hashimoto, deceased, late of Ibaraki (JP); by Fujio Hashimoto, legal representative, Ibaraki (JP); by Nobue Hashimoto, legal representative, Ibaraki (JP)

(73) Assignee: Minolta Co., Ltd., Osaka (JP)

( * ) Notice: Subject to any disclaimer, the term of this patent is extended or adjusted under 35 U.S.C. 154(b) by 785 days.

(21) Appl. No.: 09/945,659

(22) Filed: Sep. 5, 2001

(65) Prior Publication Data

US 2002/0063710 A1 May 30, 2002

(30) Foreign Application Priority Data

Sep. 5, 2000 (JP) ............................. 2000-268095
Sep. 8, 2000 (JP) ............................. 2000-273191

(51) Int. Cl.
*G06T 17/00* (2006.01)

(52) U.S. Cl. ...................................... 345/428; 345/611

(58) Field of Classification Search ................ 345/428, 345/419, 619, 625, 629, 630, 660, 667, 668, 345/669, 670, 671; 382/299
See application file for complete search history.

(56) References Cited

U.S. PATENT DOCUMENTS

| 5,689,343 A * | 11/1997 | Loce et al. ................. 358/3.21 |
| 5,751,921 A | 5/1998 | Fujimoto |
| 5,751,929 A | 5/1998 | Ohnuma et al. |
| 6,128,021 A * | 10/2000 | van der Meulen et al. . 345/428 |
| 6,233,366 B1 * | 5/2001 | Ushida ........................ 382/298 |
| 6,266,042 B1 * | 7/2001 | Aratani ........................ 345/698 |
| 6,307,651 B1 * | 10/2001 | Ohtani et al. ................ 358/524 |
| 6,332,666 B1 * | 12/2001 | Ikeda ............................ 347/40 |
| 6,462,738 B1 * | 10/2002 | Kato ............................ 345/428 |
| 6,483,521 B1 * | 11/2002 | Takahashi et al. .......... 345/630 |
| 6,509,931 B1 * | 1/2003 | Mizosoe et al. ............. 348/458 |
| 6,522,339 B1 * | 2/2003 | Orimo ......................... 345/606 |

FOREIGN PATENT DOCUMENTS

| JP | 10-193685 | 7/1988 |
| JP | 07-085265 | 3/1995 |
| JP | 08-214167 | 8/1996 |
| JP | 10-229493 | 8/1998 |
| JP | 2000-069278 | 3/2000 |

* cited by examiner

*Primary Examiner*—Mark Zimmerman
*Assistant Examiner*—Enrique L. Santiago
(74) *Attorney, Agent, or Firm*—Buchanan Ingersoll & Rooney PC

(57) ABSTRACT

There is provided an image processing apparatus and an image processing method capable of conducting different manners of resolution conversion processing depending on scanning direction. An image processing apparatus 1 includes: a sub-scanning-directional first resolution converting section 4 for enhancing resolution of input image data in a sub-scanning direction; a sub-scanning-directional second resolution converting section 5; a main-scanning-directional first resolution converting section 14 for enhancing resolution of input image data in a main-scanning direction; and a main-scanning-directional second resolution converting section 15. The structure such as above enables the image processing apparatus 1 to conduct resolution conversion processing in sub-scanning direction and main-scanning direction independently, thereby to obtain a high-quality output image.

19 Claims, 26 Drawing Sheets

SUB-SCANNING DIRECTION

FIG. 11A
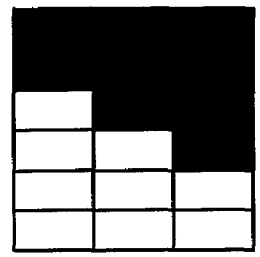
FIG. 11B
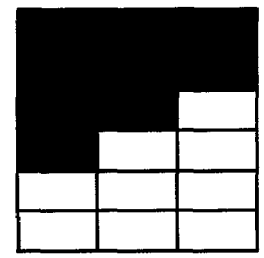
FIG. 12A
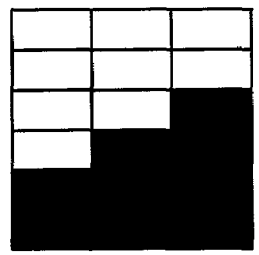
FIG. 12B
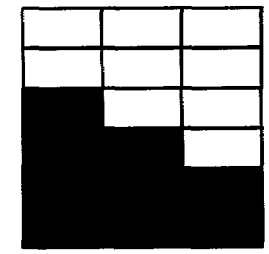
FIG. 13
| W22A | W23A | W24A |
|------|------|------|
| W22B | W23B | W24B |
| W32A | W33A | W34A |
| W32B | W33B | W34B |
| W42A | W43A | W44A |
| W42B | W43B | W44B |

FIG. 31        MAIN-SCANNING DIRECTION
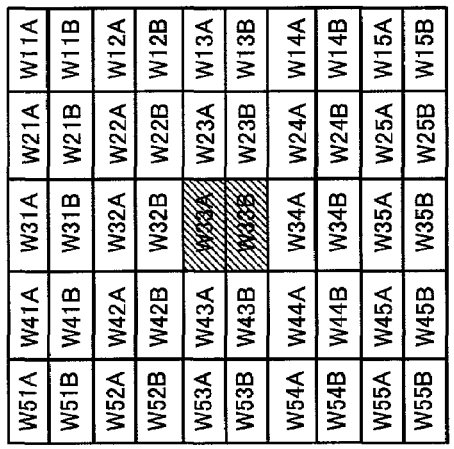
FIG. 32A        FIG. 32B
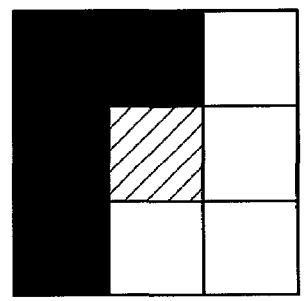        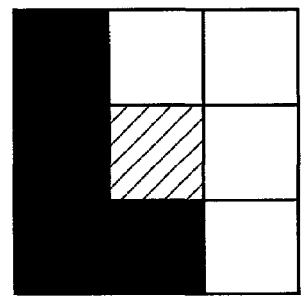
FIG. 33A        FIG. 33B
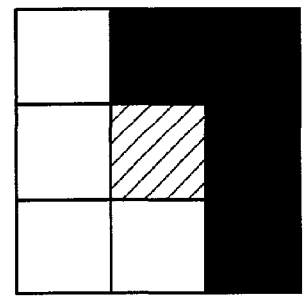        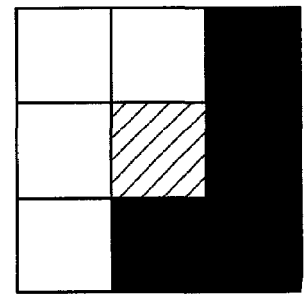

IMAGE PROCESSING APPARATUS AND IMAGE PROCESSING METHOD

This application is based on applications Ser. Nos. 2000-268095 and 2000-273191 filed in Japan, contents of which are hereby incorporated by reference.

BACKGROUND OF THE INVENTION

1. Field of the Invention

The present invention relates to an image processing apparatus and an image processing method which aims to obtain output images with high quality. More particularly, it relates to an image processing apparatus and an image processing method which conduct different resolution conversion processing for each scanning direction.

2. Description of Related Art

There has been known image processing technology to enhance resolution of input image data, which aims to obtain output images with high quality. As an example of image processing technology of this kind, U.S. Pat. No. 5,751,929 discloses image processing to enhance resolution in only one scanning direction (a main-scanning direction, for example). As another example of that, the JP Laid-open Patent Publication No. 10-229493 discloses a manner to enhance resolution, wherein region discrimination of image data is conducted in accordance with two-dimensional pattern matching and printing position of the output image is adjusted in accordance with the discrimination result.

However, in the above-mentioned image processing technology, it was not feasible to conduct different manners of resolution conversion processing depending on scanning direction. For example, this kind of difficulty holds true in an image such that is an edge region in a main-scanning direction while a non-edge region in a sub-scanning direction, i.e., a character image continuously changing its density, or the like. Therefore, there have been some difficulties to obtain a high-quality output image depending on type of image. Such difficulties arise because conventional image processing technology applies multi-gradation expression relying on area gradation such as pulse duration modulation and because resolution conversion processing is basically conducted in a one-dimensional direction.

SUMMARY OF THE INVENTION

The present invention has been made in order to solve the foregoing problem. It is an object of the present invention to provide an image processing apparatus and an image processing method capable of conducting different manners of resolution conversion processing depending on scanning direction.

An image processing apparatus of the present invention comprises: a first resolution converter for conducting resolution conversion of image data with respect to a sub-scanning direction; and a second resolution converter for conducting resolution conversion of image data outputted by the first resolution converter with respect to a main-scanning direction crossing the sub-scanning direction.

In this image processing apparatus, the first resolution converter conducts resolution conversion of image data with respect to the sub-scanning direction. Image data is inputted to an image processing apparatus by an appliance equipped with the image processing apparatus as follows. That is, if the appliance is a copier, image data is inputted from a scanner. If it is a printer, image data is inputted from its input port. If it is a facsimile, image data is inputted from its input port or facsimile modem.

Next, the second resolution converter conducts resolution conversion of the image data outputted from the first resolution converter with respect to the main-scanning direction. It should be noted that the main-scanning direction is a direction crossing the sub-scanning direction. In general, one of the two scanning directions is called a main-scanning direction and the other is called a sub-scanning direction. Accordingly, image data finally outputted from the image processing apparatus has had resolution conversion processing on different two scanning directions, namely, the main-scanning direction and the sub-scanning direction.

Therefore, appropriate resolution conversion processing can be conducted even though it is image data containing an area which is in an edge region in a main-scanning direction while a non-edge region in a sub-scanning direction. Thereby, an output image can be obtained with high quality.

Furthermore, an image processing apparatus of the present invention may comprise: a first resolution converter for conducting resolution conversion of image data with respect to a first scanning direction of image data; a second resolution converter for conducting resolution conversion of image data with respect to a second scanning direction crossing the first scanning direction separately from the first resolution converter; and an image data synthesizer for synthesizing output data of the first resolution converter and that of the second resolution converter.

In this image processing apparatus, the first resolution converter conducts resolution conversion with respect to the first scanning direction of the image data. Independent of the processing of the first resolution converter, the second resolution converter conducts resolution conversion with respect to the second scanning direction of the image data. Next, the image data synthesizer synthesizes output data of the first resolution converter and that of the second resolution converter. Accordingly, image data finally outputted from the image processing apparatus also has had resolution conversion processing on different two scanning directions, namely, the first scanning direction and the second scanning direction.

Therefore, appropriate resolution conversion processing can be conducted even though it is image data containing an area which is in an edge region in a main-scanning direction while a non-edge region in a sub-scanning direction. Thereby, an output image can be obtained with high quality.

In the image processing apparatus according to the present invention, the first resolution converter preferably includes: a first resolution converting section; a second resolution converting section; and a first region discriminating section for discriminating whether or not each pixel of the image data belongs to the edge region with respect to the first scanning direction; and the first resolution converter selects and outputs one of the outputs obtained from the first and second resolution converting sections based on discrimination result obtained by the first region discriminating section. Thereby, resolution conversion with respect to the first scanning direction is appropriately conducted based on discrimination whether or not an objective region belongs to the edge region in the first scanning direction.

Similar to the first resolution converter, the second resolution converter of the inventive image processing apparatus preferably includes: a third resolution converting section; a fourth resolution converting section; and a second region discriminating section for discriminating whether or not each pixel of the image data belongs to the edge region with respect to the second scanning direction; and the second resolution converter selects and outputs one of the outputs obtained from the third and fourth resolution converting sections based on discrimination result obtained by the second region discriminating section. Thereby, resolution conversion with respect to the second scanning direction is appropriately conducted based on discrimination whether or not an objective region belongs to the edge region in the second scanning direction. It should be noted that wording (prefix) of "main-" and "sub-" used herein does not mean that one of the two similar type component elements is subordinate to the other.

Furthermore, in the image processing apparatus of the present invention, one of the first and the second resolution converters includes an edge characteristic evaluating section for evaluating edge characteristic with respect to a corresponding scanning direction, and resolution conversion with respect to the corresponding scanning direction is conducted in accordance with an evaluation result obtained by the edge characteristic evaluating section. It should be noted that wording "an edge characteristic" used herein means sequence of bright pixel and dark pixel with respect to the corresponding scanning direction. Output data obtained by such a resolution converting section is preferably used for a region discriminated as edge region by a region discriminating section.

Furthermore, the image processing apparatus of the present invention preferably includes a third resolution converter for conducting resolution conversion with respect to both the first and second scanning directions of image data and a third region discriminating section for discriminating whether or not each pixel of the image data belongs to gradation image region. In this case, the image processing apparatus selects either an output of the second resolution converter or that of the third resolution converter in accordance with a discrimination result obtained by the third region discriminating section. Alternatively, the image processing apparatus selects an output of the image data synthesizer or that of the third resolution converter in accordance with an evaluation result obtained by the third region discriminating section. This is because resolution conversion processing for each scanning direction is not required with respect to gradation image region.

Still further, an image processing method of the present invention includes a step of converting resolution with respect to a sub-scanning direction for image data and a step of converting resolution with respect to a main-scanning direction for image data which is after resolution conversion with respect to the sub-scanning direction.

Still further, an image processing method of the present invention includes a step that resolution conversion with respect to a first scanning direction and resolution conversion with respect to a second scanning direction crossing the first scanning direction are conducted for image data independently, and a step that the image data with its resolution converted with respect to the first scanning direction and the image data with its resolution converted with respect to the second scanning direction are synthesized and outputted as synthesized image data.

Thus apparent from the foregoing descriptions, the present invention provides an image processing apparatus and an image processing method wherein different resolution conversion processing can be conducted depending on scanning direction.

BRIEF DESCRIPTION OF THE DRAWINGS

For a better understanding of the present invention, reference is made to the following detailed description of the invention, just in conjunction with the accompanying drawings in which:

FIG. 11 shows an example of processing result (moved-upward pattern) obtained at a sub-scanning-directional second resolution converting section;

FIG. 12 shows an example of processing result (moved-downward pattern) obtained at the sub-scanning-directional second resolution converting section;

FIG. 13 shows image data structure processed by an FIFO memory;

FIG. 31 shows an example of data structure after a main-scanning-directional first resolution converting section applies resolution conversion processing to image data;

FIG. 32 shows an image pattern (moved-leftward pattern) stored in the edge characteristic evaluating section in advance;

FIG. 33 shows an image pattern (moved-rightward pattern) stored in the edge characteristic evaluating section in advance;

DETAILED DESCRIPTION OF THE PREFERRED EMBODIMENTS

Hereinafter, preferred embodiments in which an image processing apparatus according to the present invention is embodied will be described in detail with respect to the accompanying drawings. The embodiments are directed to an image processing apparatus and an image processing method.

(First Embodiment)

Figure 1:
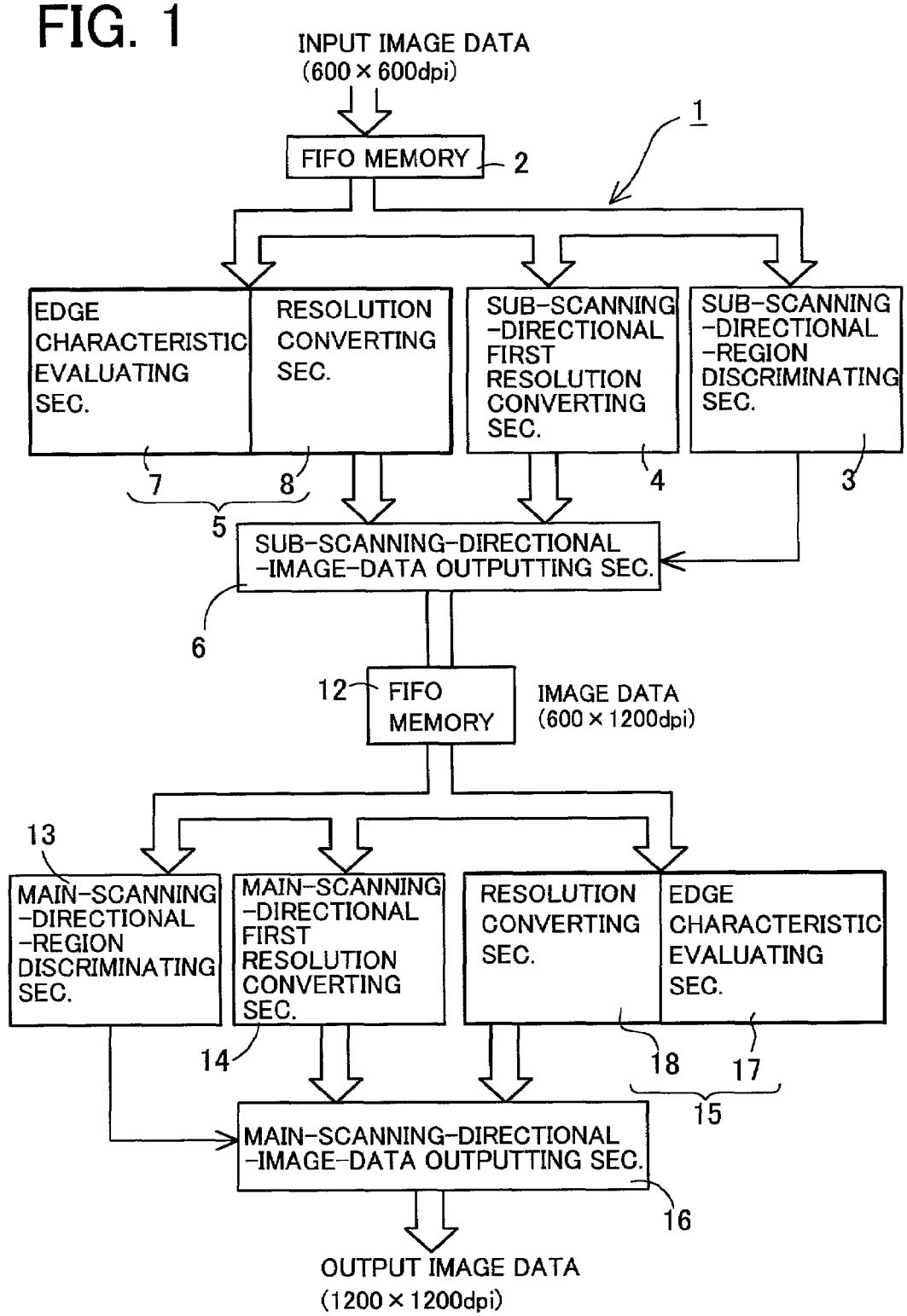
FIG. 1 is a block diagram schematically showing the structure of an image processing apparatus directed to a First Embodiment.

Now, a first embodiment will be described hereafter. As shown in FIG. 1, an image processing apparatus 1 includes: an FIFO (First In/First Out) memory 2; a sub-scanning-directional region discriminating section 3; a sub-scanning-directional first resolution converting section 4; a sub-scanning-directional second resolution converting section 5; a sub-scanning-directional-image-data outputting section 6; an FIFO memory 12; a main-scanning-directional-region discriminating section 13; a main-scanning-directional first resolution converting section 14; a main-scanning-directional second resolution converting section 15; and a main-scanning-directional-image-data outputting section 16.

The sub-scanning-directional second resolution converting section 5 consists of an edge characteristic evaluating section 7 and a resolution converting section 8. The main-scanning-directional second resolution converting section 15 consists of an edge characteristic evaluating section 17 and a resolution converting section 18. The image processing apparatus 1 is designed to output input image data of 600×600 dpi (dots per inch) readout by a scanner or the like to a printer or the like as output image data of 1200×1200 dpi.

Figure 2:
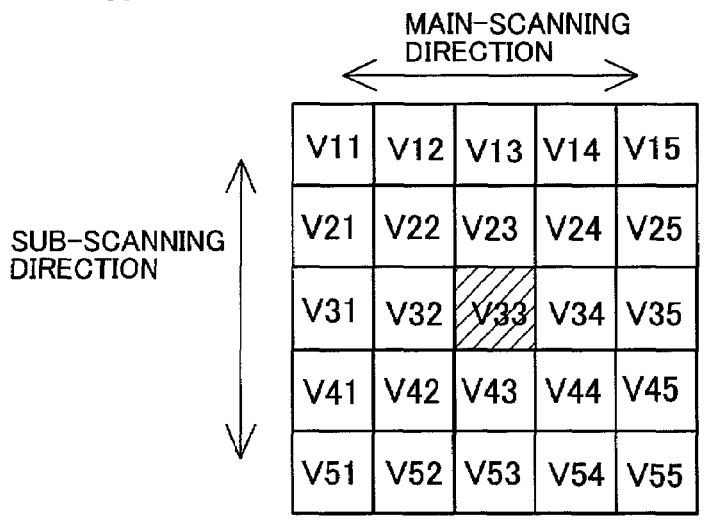
FIG. 2 shows image data structure processed by an FIFO memory.

The FIFO memory 2 converts input image data readout by a scanner or the like into raster type data structure such as shown in FIG. 2. In this specification, as shown in FIG. 2, a latitudinal direction and a longitudinal direction are defined main-scanning direction and sub-scanning direction, respectively. The main-scanning direction and the sub-scanning direction cross at right angle. The main-scanning direction means linear direction with respect to an image. As widely known, a scanner equipped with line sensors readouts image by line by line. The main-scanning direction corresponds to this linear direction, or arrangement direction of line sensors. On the other hand, the sub-scanning direction corresponds to a direction to move readout line of line sensors, i.e., a direction to move a document and the line sensors relatively.

Figure 3:
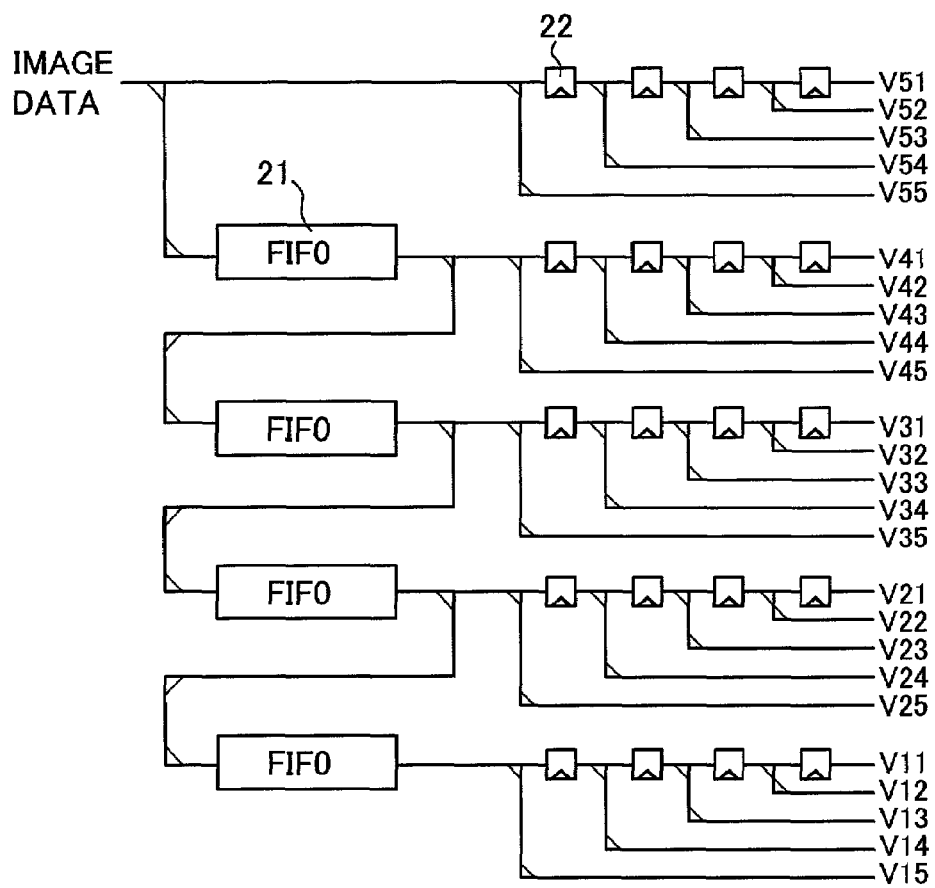
FIG. 3 shows the structure of an FIFO memory.
Figure 4:
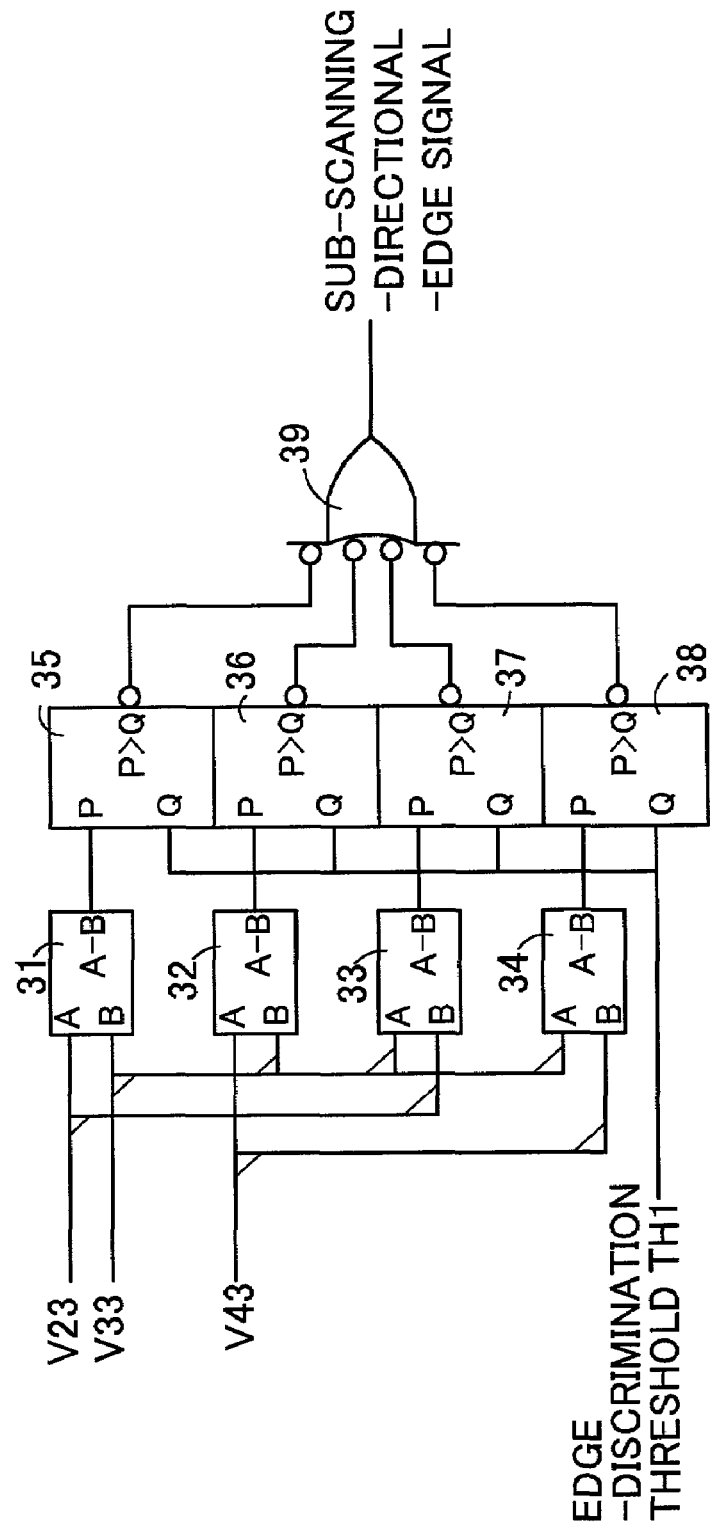
FIG. 4 shows the structure of a sub-scanning-directional-region discriminating section.

Descriptions hereinafter will be given provided that a target pixel is basically V33. As shown in FIG. 3, the FIFO memory 2 consists of four FIFOs 21 and twenty FFs (Flip-Flop) 22. Each FIFO 21 records one line of image data. It should be noted that image data converted into raster type data structure is inputted to the sub-scanning-directional region discriminating section 3, the sub-scanning-directional first resolution converting section 4, and the sub-scanning-directional second resolution converting section 5, respectively.

Let us revert to FIG. 1. The sub-scanning-directional region discriminating section 3 discriminates whether each pixel of input image data belongs to an edge region or not just with respect to sub-scanning direction. For example, as for the target pixel V33 (see FIG. 2), region discrimination with respect to the sub-scanning direction is conducted using pixels V23 and V43 adjacent to V33. The sub-scanning-directional region discriminating section 3 consists of four subtracters 31, 32, 33, 34, four comparators 35, 36, 37, 38, and an OR circuit 39.

Each of the subtracters 31 through 34 has input terminals A and B. The four subtracters are designed to output difference of their input value (A−B) as calculation result. More specifically, provided that a target pixel is V33, image data of a pixel V23 and that of a pixel V33 are inputted to the input terminal A and the input terminal B for the subtracter 31, respectively. As for the subtracter 32, image data of V43 and that of V33 are inputted to its input terminal A and input terminal B, respectively. As for the subtracter 33, image data of V33 and that of V23 are inputted to its input terminal A and input terminal B, respectively. As for the subtracter 34, image data of v33 and that of V43 are inputted to its input terminal A and input terminal B, respectively.

Accordingly, the subtracter 31 outputs a difference (V23−V33). The subtracter 32 outputs a difference (V43−V33). The subtracter 33 outputs a difference (V33−V23). The subtracter 34 outputs a difference (V33−V43).

Outputs of the subtracters 31, 32, 33, and 34 are inputted to input terminals P of comparators 35, 36, 37, and 38, respectively. An edge-discrimination threshold TH1 is inputted to input terminals Q of respective comparators 35, 36, 37, and 38. Thereby, each of the comparators 35 through 38 is designed to output a comparison result (P>Q or not). Outputs of comparison results obtained by the comparators 35 through 38 are inputted to the OR circuit 39. Then, an output from the OR circuit 39 corresponds to a sub-scanning-directional-edge signal.

The sub-scanning-directional region discriminating section 3 structured such as above makes region discrimination such as follows. When at least one of the gradation differences between the target pixel (V33) and its adjacent pixels (V23, V43) exceeds the edge-discrimination threshold TH1, it is discriminated that the target pixel belongs to an edge region. On the other hand, when none of the gradation differences exceeds the edge-discrimination threshold TH1, it is discriminated that a pixel does not belong to an edge region.

Figure 5:
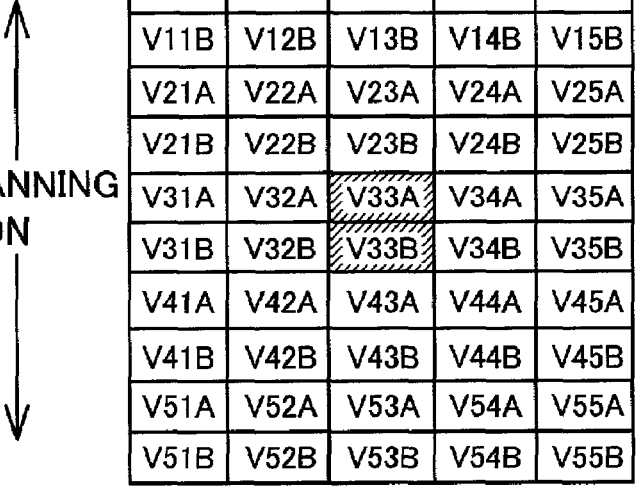
FIG. 5 shows an example of data structure after a sub-scanning-directional first resolution converting section applies resolution conversion processing to image data.

Let us revert to FIG. 1 again. The sub-scanning-directional first resolution converting section 4 conducts processing for enhancing resolution of input image data with respect to the sub-scanning direction. More specifically, the sub-scanning-directional first resolution converting section 4 converts a data structure of input image data shown in FIG. 2 into a data structure shown in FIG. 5. That is, for each pixel, the number of data is doubled in the sub-scanning direction.

Figure 6:
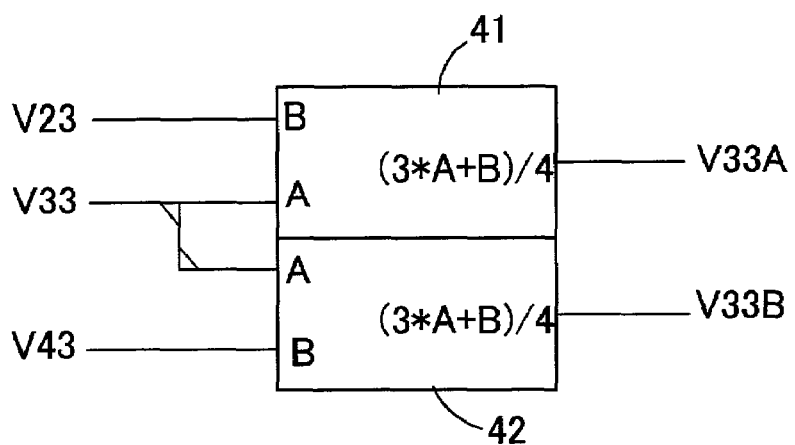
FIG. 6 shows the structure of the sub-scanning-directional first resolution converting section.

As shown in FIG. 6, the sub-scanning-directional first resolution converting section 4 consists of two arithmetic operators 41 and 42. Each of the arithmetic operators 41 and 42 has input terminals A and B. Thereby, an arithmetic operation result $((3 \times A+B)/4)$ with respect to an input value is outputted. More specifically, provided that a target pixel is V33, image data of a pixel V33 and that of a pixel V23 are inputted to the input terminal A and the input terminal B for the arithmetic operator 41, respectively. As for the arithmetic operator 42, image data of V33 and that of V43 are inputted to its input terminal A and input terminal B, respectively. An output of the arithmetic operator 41 and that of the arithmetic operator 42 correspond to image data of pixel V33A and pixel V33B, respectively. That is, the target pixel V33 is divided into pixels V33A and V33B. Thereby, the number of data for V33 is doubled.

The sub-scanning-directional second resolution converting section 5 evaluates edge characteristic of input image data with respect to the sub-scanning direction and conducts resolution conversion processing to enhance resolution with respect to the sub-scanning direction based on the evaluation result. Therefore, the sub-scanning-directional second resolution converting section 5 is equipped with the edge characteristic evaluating section 7 and the resolution converting section 8.

Figure 7:
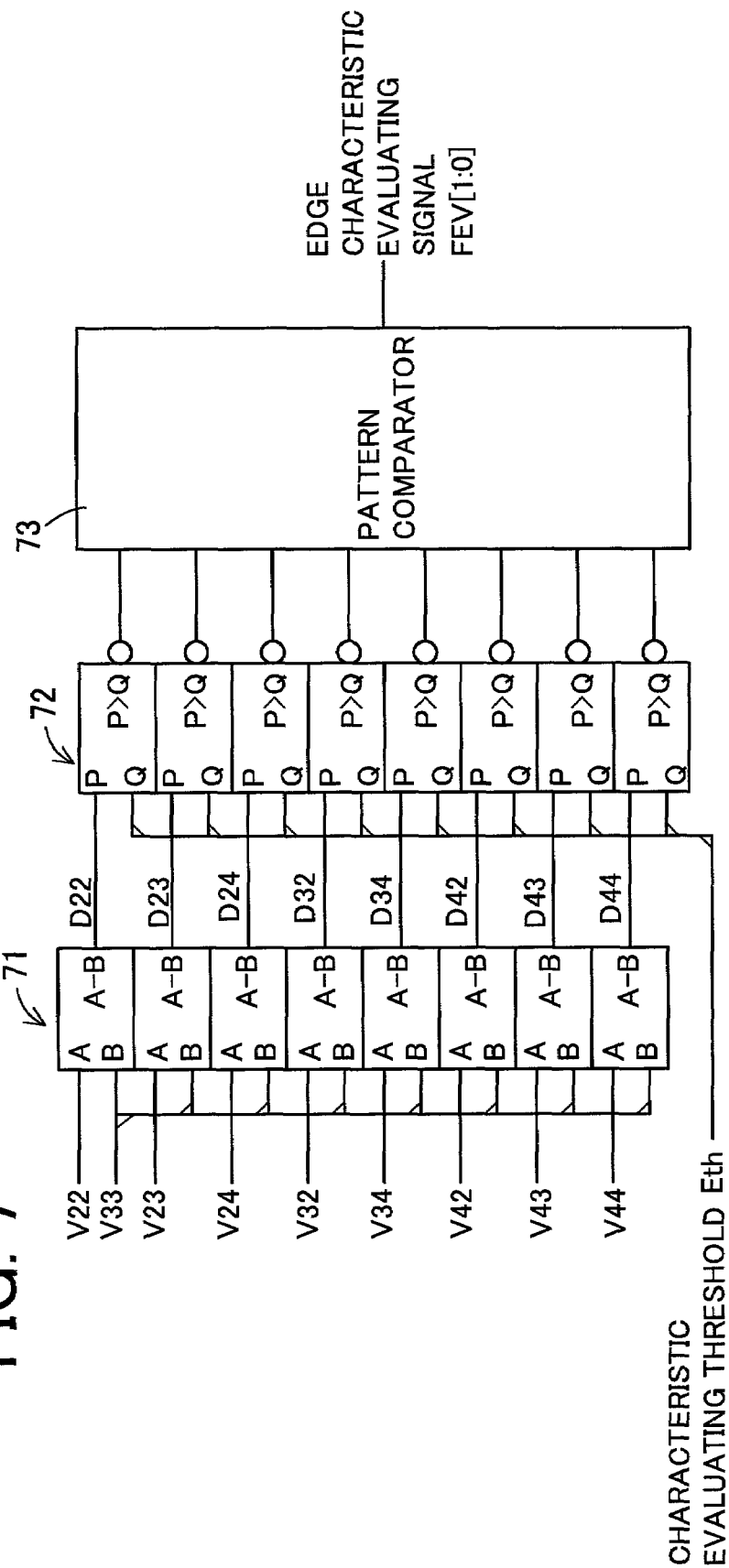
FIG. 7 shows the structure of an edge characteristic evaluating section.

Firstly, the structure of the edge characteristic evaluating section 7 will be described. The edge characteristic evaluating section 7 evaluates edge characteristic of input image data with respect to a sub-scanning direction. As shown in FIG. 7, the edge characteristic evaluating section 7 consists of eight subtracters 71, eight comparators 72 and a pattern comparator 73. Each of the subtracters 71 has input terminals A and B and outputs a difference of an input value (A−B). Thus, gradation differences (D22, D23, D24, D32, D34, D42, D43, D44) with respect to the target pixel (V33) and its eight adjacent pixels (V22, V23, V24, V32, V34, V42, v43, V44) are obtained by the subtracters 71.

Furthermore, outputs from respective subtracters 71, i.e., gradation differences are inputted to the terminals P for respective comparators 72. The characteristic evaluating threshold Eth is inputted to the terminals Q. Then, comparison results between the gradation differences between the target pixel (V33) and its eight adjacent pixels (V22, V23 V24, V32, V34, V42, V43, V44) and the characteristic evaluating threshold Eth are inputted to the pattern comparator 73. That is, each of the comparators 72 applies bi-level processing to gradation differences between the target pixel and its eight adjacent pixels using the characteristic evaluating threshold Eth. Each of image data to which bi-level processing is applied with respect to the target pixel and the eight adjacent pixels is inputted to the pattern comparator 73.

Figure 8A:
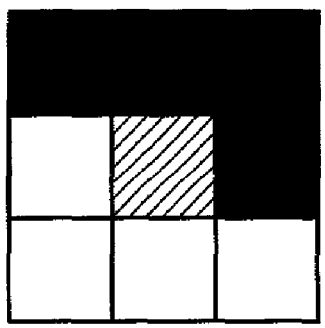
FIG. 8 shows an image pattern (moved-upward pattern) stored in the edge characteristic evaluating section in advance.
Figure 8B:
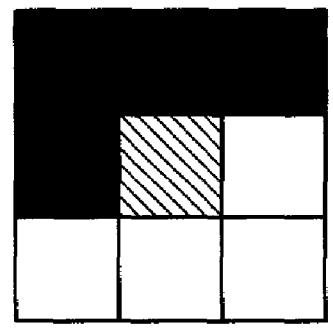
Figure 9A:
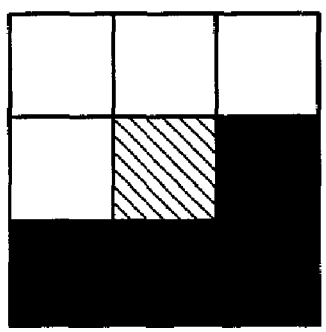
FIG. 9 shows an image pattern (moved-downward pattern) stored in the edge characteristic evaluating section in advance.
Figure 9B:
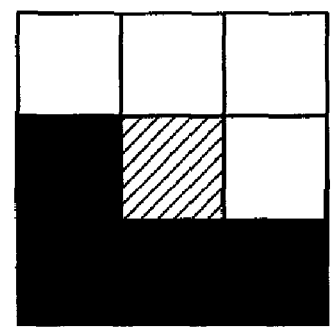

The pattern comparator 73 evaluates image patterns of the eight adjacent pixels to which bi-level processing is applied. In the pattern comparator 73, "moved-upward pattern" shown in FIGS. 8A and 8B, and "moved-downward pattern" shown in FIG. 9A, 9B are stored. The pattern comparator 73 discriminates whether or not image patterns to which bi-level processing applied with respect to the target pixel and the eight adjacent pixels coincide with either the "moved-upward pattern" or the "moved-downward pattern". In case it is discriminated that an image pattern coincides with the "moved-upward pattern", the target pixel is evaluated as "moved-upward edge". In case an image data coincides with the "moved-downward pattern" the target pixel is evaluated as "moved-downward edge". In case an image pattern coincides with neither the "moved-upward pattern" nor the "moved-downward pattern", the target pixel is evaluated as "normal edge".

An evaluation signal FEV[1:0] outputted from the pattern comparator 73 is a two-bit signal. Specifically, in case of normal edge, a signal [00] (binary system, indicated the same system herein after) is outputted. In case of moved-upward edge, a signal [10] is outputted. In case of moved-downward edge, a signal [11] is outputted. An outputted signal is inputted to the resolution converting section 8.

Next, the resolution converting section 8 will be described. In accordance with an evaluation at the edge characteristic evaluating section 7, the resolution converting section 8 conducts computation of image data for each pixel obtained in case resolution of the target pixel is enhanced with respect to the sub-scanning direction. For example, provided that the target pixel is V33, the resolution converting section 8 conducts computation of image data for V33A and V33B.

Figure 10:
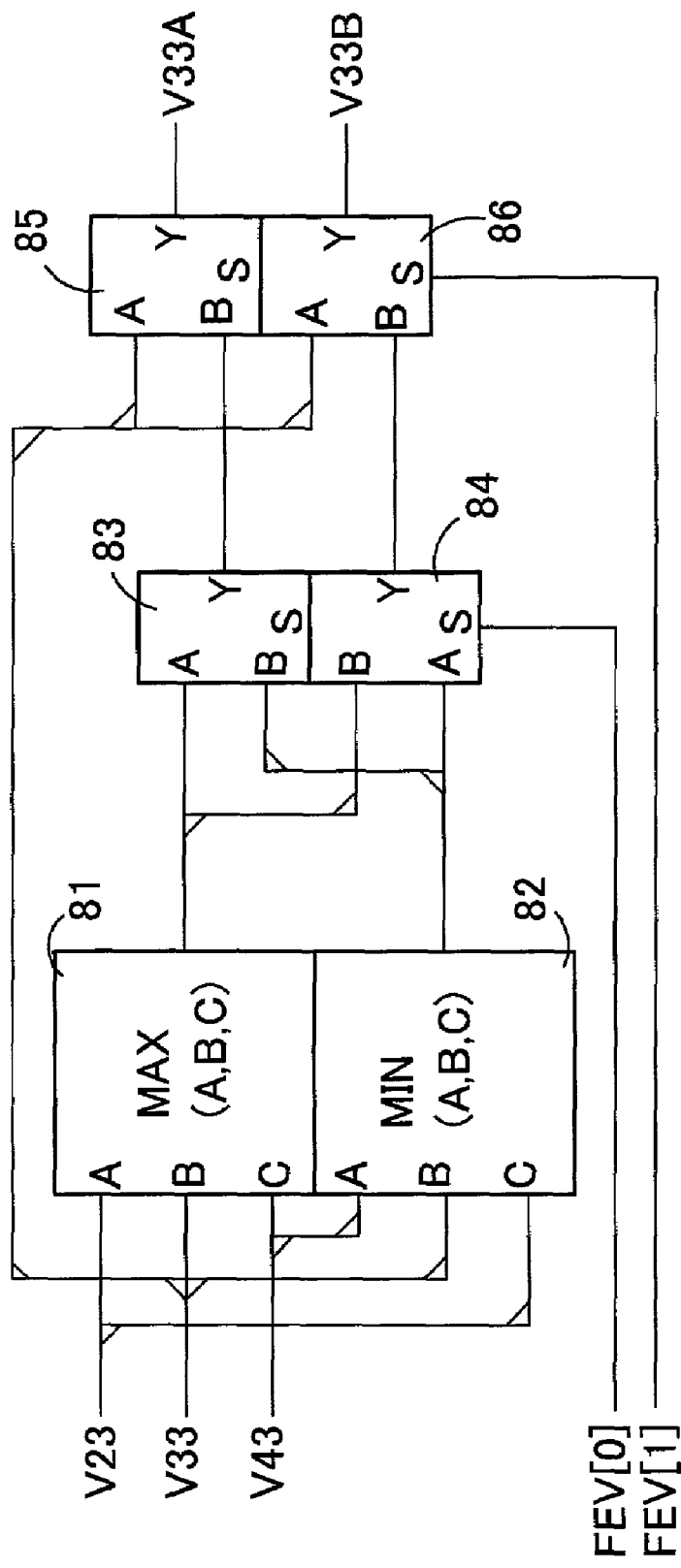
FIG. 10 shows the structure of a resolution converting section.

As shown in FIG. 10, the resolution converting section 8 consists of two arithmetic operators 81, 82, and four selectors 83, 84, 85, 86. Both the arithmetic operators 81 and 82 have three input terminals A, B, C. Image data for the target pixel and two pixels adjacent to the target pixel in the sub-scanning direction are inputted to these three terminals. Specifically, provided that V33 is the target pixel, in the arithmetic operator 81, image data corresponding to pixels V23, V33, and v43 are inputted to the terminals A, B, and C, respectively. In the arithmetic operator 82, image data corresponding to pixel V43, V33, and V23 are inputted to the terminals A, B, and C, respectively.

From the arithmetic operator 81, a maximum value among the three values inputted to the terminals A, B, and C is outputted. The output from the arithmetic operator 81 is inputted to the terminal A for the selector 83 and the terminal B for the selector 84. On the other hand, from the arithmetic operator 82, a minimum value among the three values inputted to the terminals A, B, and C is outputted. The output from the arithmetic operator 82 is inputted to the terminal B for the selector 83 and the terminal A for the selector 84.

Other than terminals A and B, the selectors 83 and 84 have select signal inputting terminals S. A signal FEV[0], the lower significant bit signal of the evaluation signals outputted from the patterns comparator 73, is inputted to the select signal inputting terminals S. In case the signal FEV[0] to be outputted to the their terminals S is [0], the selectors 83, 84 output an input value for the terminals A. In case the signal FEV[0] is [1], the selectors 83, 84 output an input value for the terminals B.

That is, in case the input signal FEV[0] to be transmitted to the terminal S is [0] (a case of normal edge or moved-upward edge), the selector 83 outputs a maximum value of image data to be inputted to the arithmetic operator 81 whereas the selector 84 outputs a minimum value of image data to be inputted to the arithmetic operator 82. Furthermore, in case the input signal FEV[0] to be transmitted to the terminal S is [1] (a case of moved-downward edge), the selector 83 outputs a minimum value of image data to be inputted to the arithmetic operator 81 whereas the selector 84 outputs a maximum value of image data to be inputted to the arithmetic operator 82. Data thus outputted from the selectors 83, and 84 are inputted to the input terminals B of the selectors 85, and 86, respectively.

On the other hand, image data of the target pixel is inputted to both the input terminals A for the selectors 85 and 86. A signal FEV[1], the more significant bit signal of the evaluation signals outputted from the patterns comparator 73, is inputted to the select signal inputting terminals S for the selectors 85 and 86. In case the signal FEV[1] to be outputted to the their terminals S is [0], the selectors 85, 86 output an input value for the terminals A. In case the signal FEV[1] is [1], the selectors 83, 84 output an input value for the terminals B.

That is, in case the input signal FEV[1] to be transmitted to the terminal S is [0] (a case of normal edge), both the selectors 85 and 86 output image data for the target pixel. Furthermore, in case the input signal FEV[1] to be transmitted to the terminal S is [1] (a case of moved-upward edge or moved-downward edge), the selector 85 outputs output data transmitted from the selector 83 whereas the selector 86 outputs output data transmitted from the selector 84. Data thus outputted from the selectors 85 and 86 are outputted by the resolution converting section 8 as the output data from the sub-scanning-directional second resolution converting section 5.

Provided that V33 is the target pixel, owing to the structure as described in the above, the resolution converting section 8 can obtain outputs such as described in the following paragraph in accordance with an evaluation results obtained by the edge characteristic evaluating section 7 with respect to image patterns of V22, V23, V24, V32, V34, V42, V43, and V44, the eight adjacent pixels for the target pixel V33.

That is, in case the edge characteristic evaluating section 7 evaluates image patterns as "moved-upward pattern", the resolution converting section 8 outputs image data having the highest gradation value among the image data for the pixels V23, V33, and V43 as the image data corresponding to the pixel V33A. As the image data corresponding to the pixel V33B, the resolution converting section 8 outputs image data having the lowest gradation value among the image data for the pixels V23, V33, and V43. As a result, image data such as shown in FIGS. 11A, and 11B are obtained. On the other hand, in case the edge characteristic evaluating section 7 evaluates image patterns as "moved-downward pattern", the resolution converting section 8 outputs image data having the lowest gradation value among the image data for the pixels V23, V33, and V43 as the image data corresponding to the pixel V33A. As the image data corresponding to the pixel V33B, the resolution converting section 8 outputs image data having the highest gradation value among the image data for the pixels V23, V33, and V43. As a result, image data as shown in FIGS. 12A, and 12B are obtained.

Let us revert to FIG. 1 again. The sub-scanning-directional-image-data outputting section 6 selects either image data outputted from the sub-scanning-directional first resolution converting section 4 or image data from the sub-scanning-directional second resolution converting section 5. The image data selection depends on a discrimination result obtained by the sub-scanning-directional region discriminating section 3. Specifically, as to pixels the sub-scanning-directional region discriminating section 3 evaluates as edge region, the sub-scanning-directional-image-data outputting section 6 selects image data outputted from the sub-scanning-directional second resolution converting section 5. As to pixels the sub-scanning-directional region discriminating section 3 evaluates as non-edge region, the sub-scanning-directional-image-data outputting section 6 selects image data outputted from the sub-scanning-directional first resolution converting section 4. Image data outputted from the sub-scanning-directional-image-data outputting section 6 is inputted to the FIFO memory 12.

Figure 14:
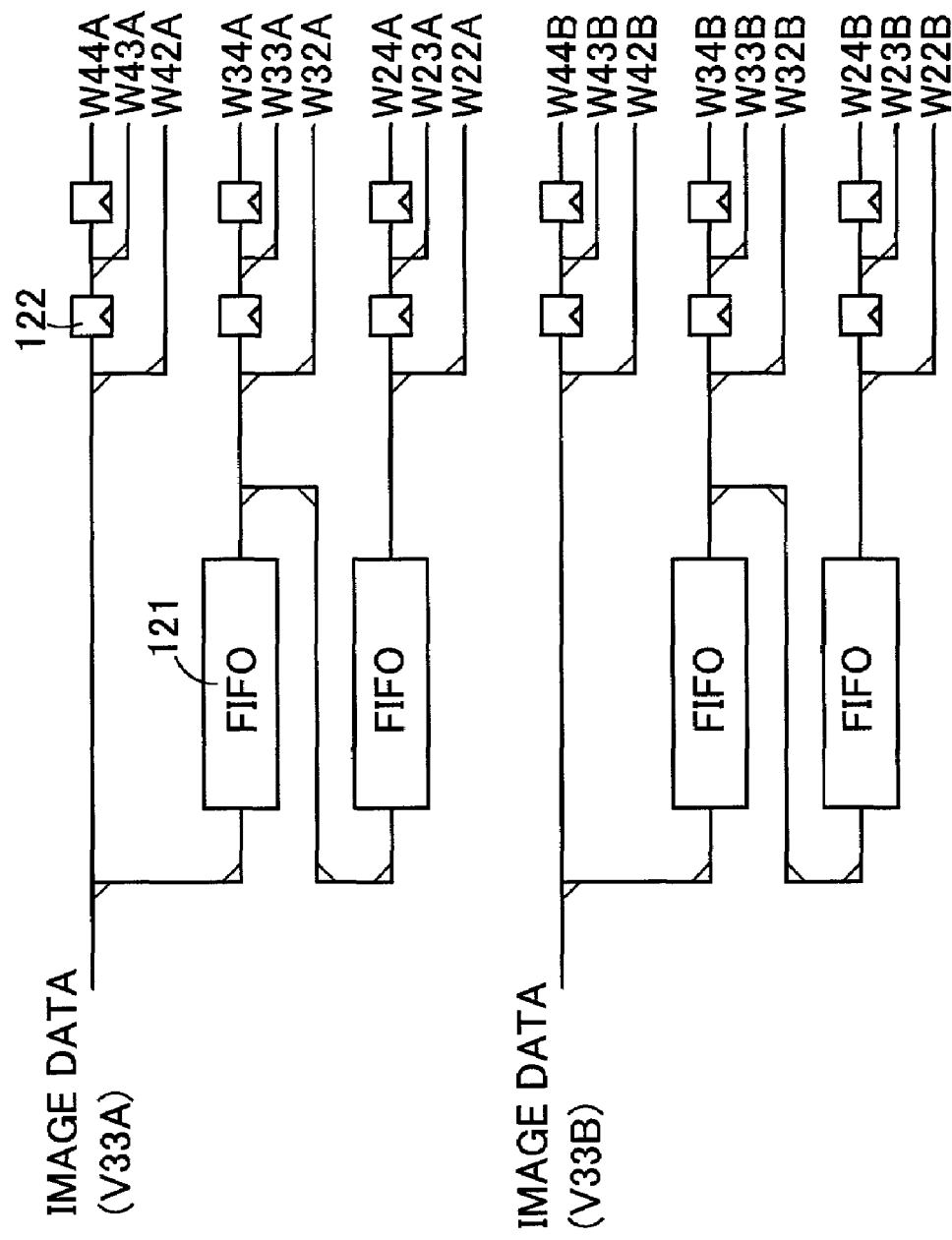
FIG. 14 shows the structure of the FIFO memory.

The FIFO memory 12 converts images data outputted from the sub-scanning-directional-image-data outputting section 6 into raster type data structure such as shown in FIG. 13. The FIFO memory 12 consists of four FIFOs 121 and twelve FFs (Flip-Flop) 122, as shown in FIG. 14. Image data the FIFO memory 12 has converted into raster type data structure is inputted into the main-scanning-directional-region discriminating section 13, the main-scanning-directional first resolution converting section 14, and the main-scanning-directional second resolution converting section 15, respectively.

The main-scanning-directional-region discriminating section 13 discriminates whether or not each pixel for the image data outputted from the sub-scanning-directional-image-data outputting section 6 belongs to edge region with respect to the main-scanning direction. For example, provided that target pixels are W33A and W33B (see FIG. 13), region discrimination is conducted with respect to main-scanning direction for the pixel W33A, i.e., the pixel W33A and its adjacent pixels W32A and W34A. Furthermore, region discrimination is also conducted with respect to main-scanning direction for the pixel W33B, i.e., the pixel W33B and its adjacent pixels W32B and W34B, at the same time. Since region discrimination should be conducted in the same scale as input image data (V33, see FIG. 2), region discriminations with respect to the pixels W33A and W33B are conducted simultaneously.

It should be noted that since processing in the same manner is conducted for each of the pixels divided into two (W33A and W33B, for example) with respect to the sub-scanning direction, each of the main-scanning-directional-region discriminating section 13, the main-scanning-directional first resolution converting section 14, and the main-scanning-directional second resolution converting section 15 is equipped with two processing circuits structured similarly so as to conduct processing for the two pixels (W33A and W33B) in parallel. Therefore, in the followings, descriptions will be only given with respect to one of the two processing circuits for a pixel (W33A, for example) to be processed in parallel and the other processing circuit for other pixel (W33B, for example) will be omitted.

Figure 15:
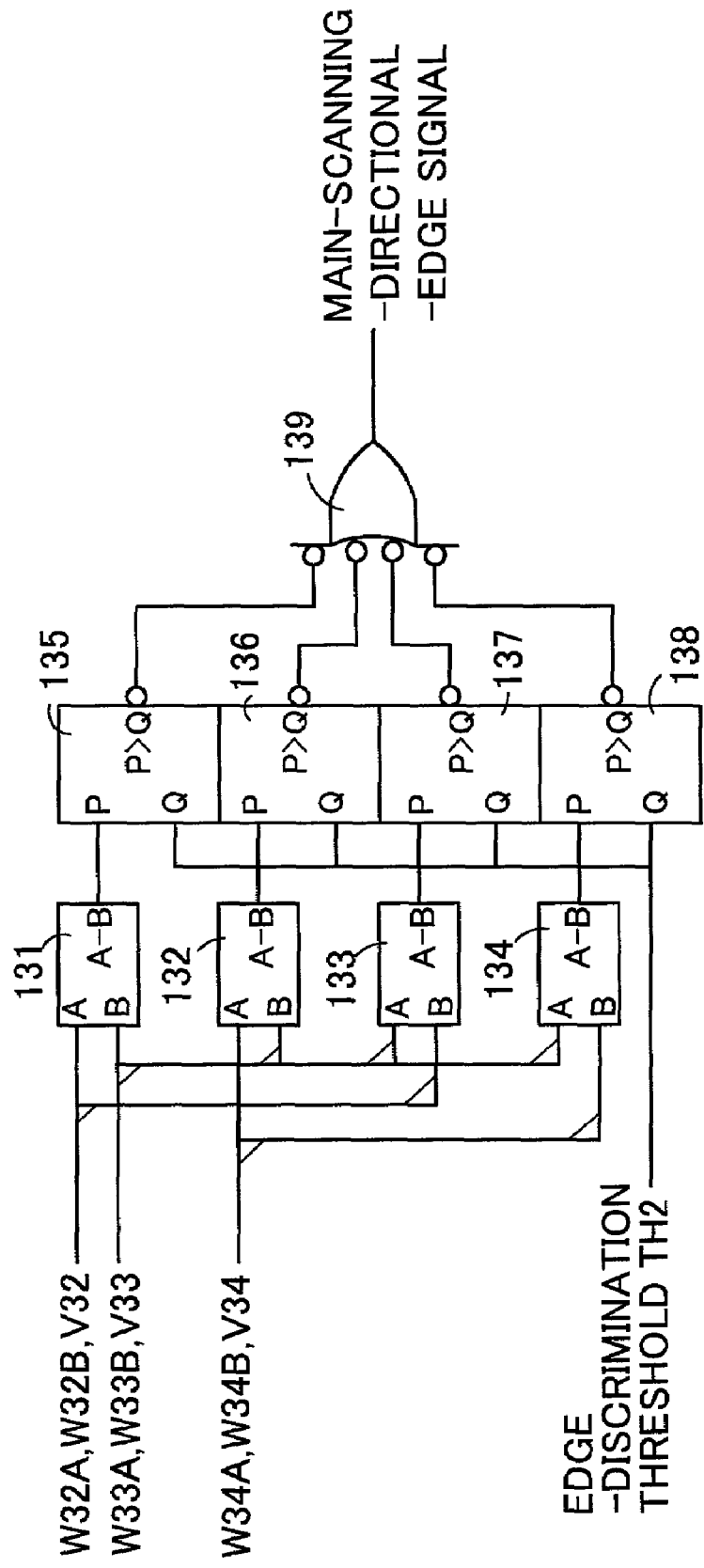
FIG. 15 shows the structure of a main-scanning-directional-region discriminating section.

The main-scanning-directional-region discriminating section 13 is equipped with two processing circuits each of which consists of four subtracters 131, 132, 133, 134, four comparators 135, 136, 137, 138 and an OR circuit 139. That is, provided that target pixels are W33A and W33B, the main-scanning-directional-region discriminating section 13 is equipped with the two processing circuits as shown in FIG. 15 so as to conduct processing for the two target pixels in parallel.

Each of the subtracters 131 through 134 has input terminals A and B. The four subtracters are designed to output differences of their input value (A−B) as calculation result. More specifically, provided that a target pixel is W33A, image data of pixel W32A and that of a pixel W33A are inputted to the input terminal A and the terminal B for the subtracter 131, respectively. As for the subtracter 132, image data of W34A and that of W33A are inputted to its input terminal A and input terminal B, respectively. As for the subtracter 133, image data of W33A and that of W32A are inputted to its input terminal A and input terminal B, respectively. As for the subtracter 134, image data of W33A and that of W34A are inputted to its input terminal A and input terminal B, respectively.

Accordingly, the subtracter 131 outputs a difference (W32A–W33A). The subtracter 132 outputs a difference (W34A–W33A). The subtracter 133 outputs a difference (W33A–W32A). The subtracter 134 outputs a difference (W33A–W34A).

Outputs of the subtracters 131, 132, 133, and 134 are inputted of input terminals P of comparators 135, 136, 137 and 138, respectively. An edge-discrimination threshold TH2 is inputted to input terminals Q of respective comparators 135, 136, 137 and 138. Thereby, each of the comparators 135 through 138 is designed to output a comparison result (P>Q or not). Outputs of comparison results obtained by the comparators 135 through 138 are inputted to the OR circuit 139. Then, an output from the OR circuit 139 corresponds to a main-scanning-directional-edge signal.

The main-scanning-directional region discriminating section 13 structured such as above makes region discrimination such as follows. When at least one of the gradation differences between the target pixel (W33A or W33B) and theirs respective two adjacent pixels (W32A, W34A or W32B, W34B) exceeds the edge-discrimination threshold TH2, it is discriminated that the target pixel (W33A or W33B) belongs to an edge region. On the other hand, when none of the gradation differences between the target pixel (W33A or W33B) and theirs respective two adjacent pixels (W32A, W34A or W32B, W34B) exceeds the edge-discrimination threshold TH2, it is discriminated that the target pixel (W33A or W33B) does not belong to an edge region.

Figure 16:
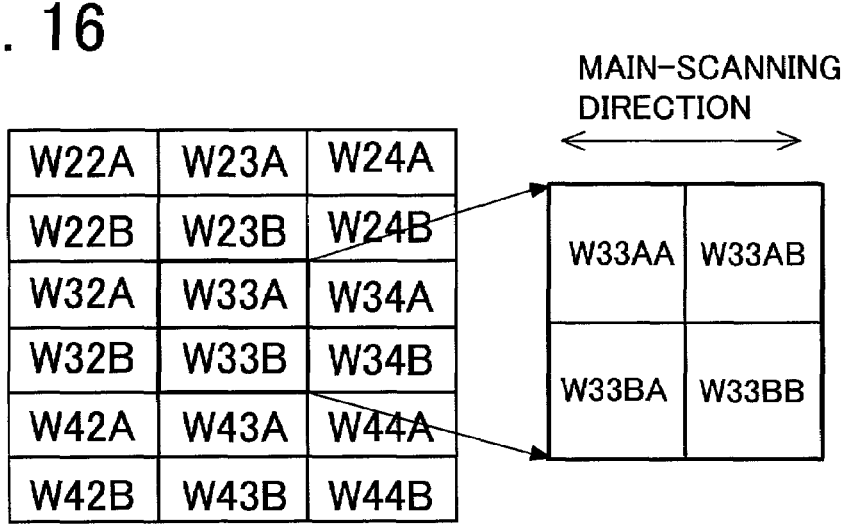
FIG. 16 shows an example of data structure after a main-scanning-directional first resolution converting section applies resolution conversion processing to image data.

Let us revert to FIG. 1 again. The main-scanning-directional first resolution converting section 14 conducts processing for enhancing resolution of image data outputted from the sub-scanning-directional-image data outputting section 6 with respect to the main-scanning direction. For example, the main-scanning-directional first resolution converting section 14 converts data structure of the pixels W33A and W33B shown in FIG. 13 (corresponding to input image data V33, see FIG. 2) into the data structure shown in FIG. 16. That is, for each pixel, the number of data is doubled in the main-scanning direction. Specifically, the pixel W33A is doubled to pixels W33AA and W33AB. Similarly, the pixel W33B is doubled to pixels W33BA and W33BB.

Figure 17:
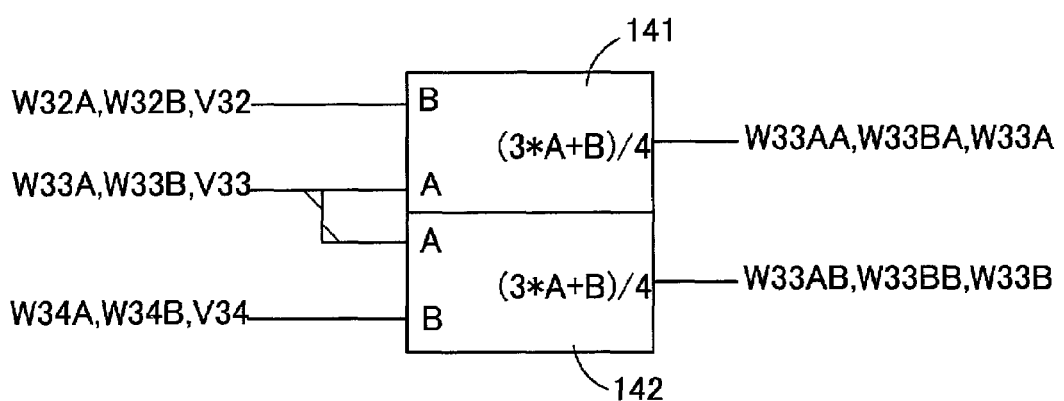
FIG. 17 shows the partial structure of the main-scanning-directional first resolution converting section.

The main-scanning-directional first resolution converting section 14 is equipped with two processing circuits consisting of two arithmetic operators 141 and 142 as shown in FIG. 17. That is, provided that target pixels are W33A and W33B, the main-scanning-directional first resolution converting section 14 is equipped with the two processing circuits shown in FIG. 17 so as to conduct conversion processing for the two target pixels in parallel. In FIG. 17, input values to be inputted in the processing circuits for conversion processing of the pixel W33A are shown as a typical example.

Each of the arithmetic operators 141 and 142 consists of terminals A and B. Thereby, an arithmetic operation result ((3×A+B)/4) with respect to an input value is outputted. More specifically, provided that a target pixel is W33A (W33B), image data of the pixel W33A (W33B) and that of the pixel W32A (W32B) are inputted to the input terminal A and the input terminal B for the arithmetic operator 141, respectively. As for the arithmetic operator 142, image data of the pixel W33A (W33B) and that of the pixel W34A (W34B) are inputted to the input terminal A and the input terminal B, respectively.

An output of the arithmetic operator 141 and that of the arithmetic operator 142 correspond to image data of a pixel W33AA (W33BA) and a pixel W33AB (W33BB), respectively. That is, the target pixel W33A (W33B) is divided into pixels W33AA (W33BA) and W33AB (W33BB). Thereby, the number of data for W33A (W33B) is doubled in the main-scanning direction.

Let us revert to FIG. 1 again. The main-scanning-directional second resolution converting section 15 evaluates edge characteristic of image data outputted from the sub-scanning-directional-image-data outputting section 6 with respect to the main-scanning direction and conducts resolution conversion processing to enhance resolution with respect to the main-scanning direction based on the evaluation result. Therefore, the main-scanning-directional second resolution converting section 15 is equipped with the edge characteristic evaluating section 17 and the resolution converting section 18.

Figure 18:
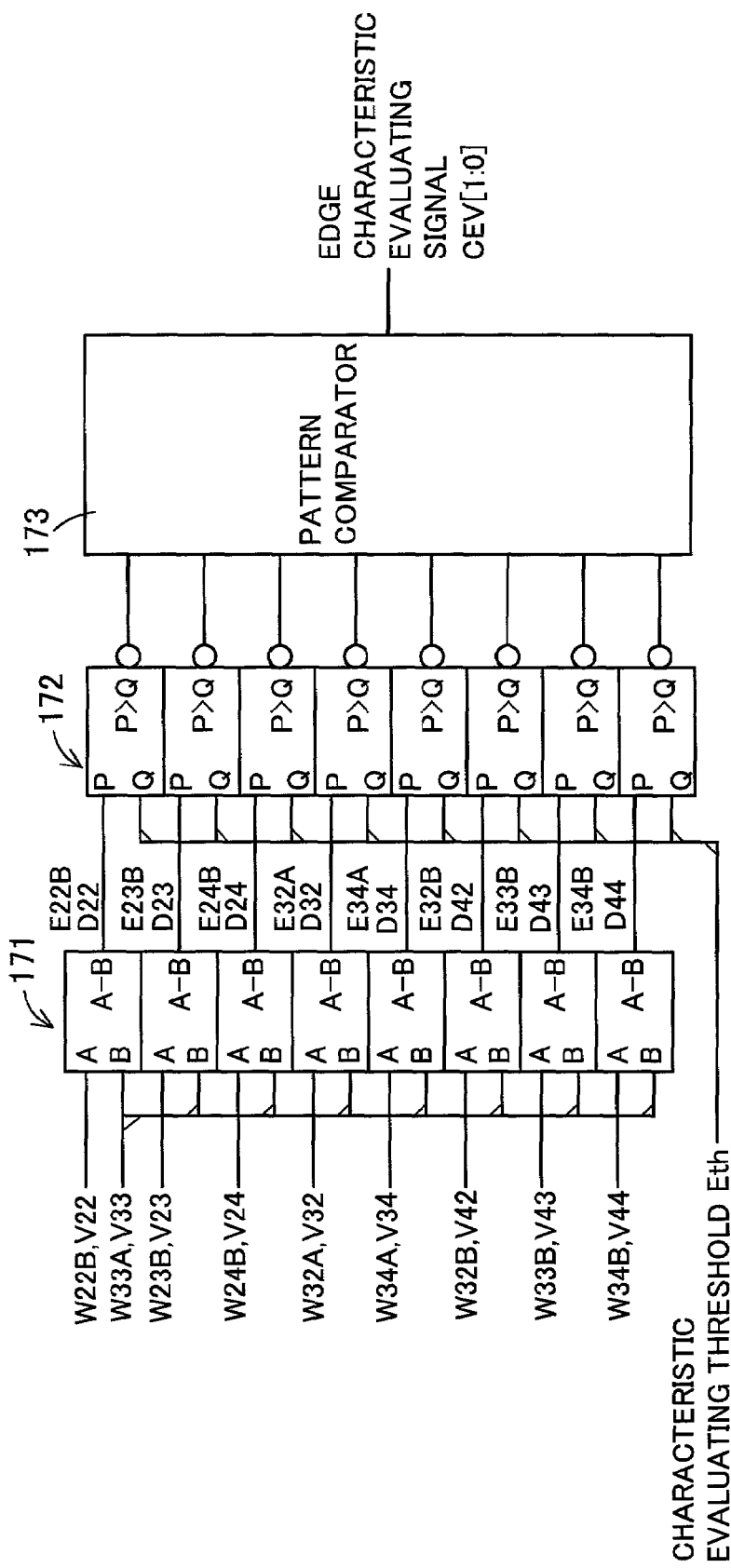
FIG. 18 shows the partial structure of an edge characteristic evaluating section.

Firstly, the structure of the edge characteristic evaluating section 17 will be described. The edge characteristic evaluating section 17 evaluates edge characteristic of image data which is to be inputted to the main-scanning-directional second resolution converting section 15 with respect to the main-scanning direction. The edge characteristic evaluating section 17 is equipped with two processing circuits each of which consists of eight subtracters 171, eight comparators 172 and a pattern comparator 173 as shown in FIG. 18. That is, provided that target pixels are W33A and W33B, the edge characteristic evaluating section 17 is equipped with two processing circuits shown in FIG. 18 so as to conduct processing for the two target pixels in parallel. In FIG. 18, input values to be inputted in the processing circuits for conversion processing of the pixel W33A are shown as a typical example.

Each of the subtracters 171 has input terminals A and B and outputs a difference of an input value (A–B). For example, provided that a target pixel is W33A, gradation differences (E22B, E23B, E24B, E32A, E34A, E32B, E33B, E34B) between the target pixel and its eight adjacent pixels (W22B, W23B, W24B, W32A, W34A, W32B, W33B, W34B) are obtained by the subtracters 171.

Furthermore, outputs from respective subtracters 171, i.e., gradation differences are inputted to the terminals P for respective comparators 172. The characteristic evaluating threshold Eth is inputted to the terminals Q. Then, comparison results with respect to the gradation differences between target pixel and its eight adjacent pixels and the characteristic evaluating threshold Eth are inputted to the pattern comparator 173. That is, each of the comparators 172 applies bi-level processing to gradation differences between the target pixel and its eight adjacent pixels using the characteristic evaluating threshold Eth. Each of image data to which bi-level processing is applied with respect to the target pixel and the eight adjacent pixels is inputted to the pattern comparator 173.

Figure 19A:
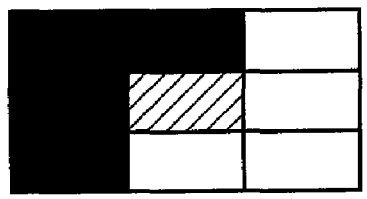
FIG. 19 shows an image pattern (moved-leftward pattern) stored in the edge characteristic evaluating section in advance.
Figure 19B:
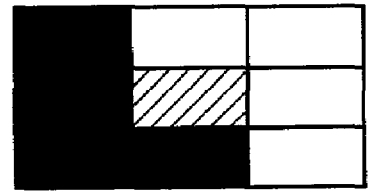
Figure 20A:
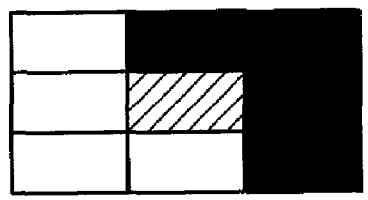
FIG. 20 shows an image pattern (moved-rightward pattern) stored in the edge characteristic evaluating section in advance.
Figure 20B:
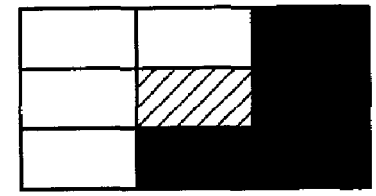

The pattern comparator 173 evaluates image patterns of the eight adjacent pixels to which bi-level processing is applied. In the pattern comparator 173, "moved-leftward pattern" shown in FIGS. 19A and 19B, and "moved-rightward pattern" shown in FIGS. 20A and 20B are stored. The pattern comparator 173 discriminates whether or not image patterns to which bi-level processing applied with respect to the target pixel and the eight adjacent pixels coincide with either the "moved-leftward pattern" or the "moved-rightward pattern". In case it is discriminated that an image pattern coincides with the "moved-leftward pattern", the target pixel is evaluated as "moved-leftward edge". In case it is discriminated that an image pattern coincides with the "moved-rightward pattern", the target pixel is evaluated as "moved-rightward edge". In case an image pattern coincides with neither the "moved-leftward pattern" nor the "moved-rightward pattern", the target pixel is evaluated as "normal edge".

An evaluation signal CEV[1:0] outputted from the pattern comparator 173 is a two-bit signal. Specifically, in case of normal edge, a signal [00] is outputted. In case of move-leftward edge, a signal [10] is outputted. In case of moved-rightward edge, a signal [11] is outputted. An outputted signal is inputted to the resolution converting section 18.

Figure 21:
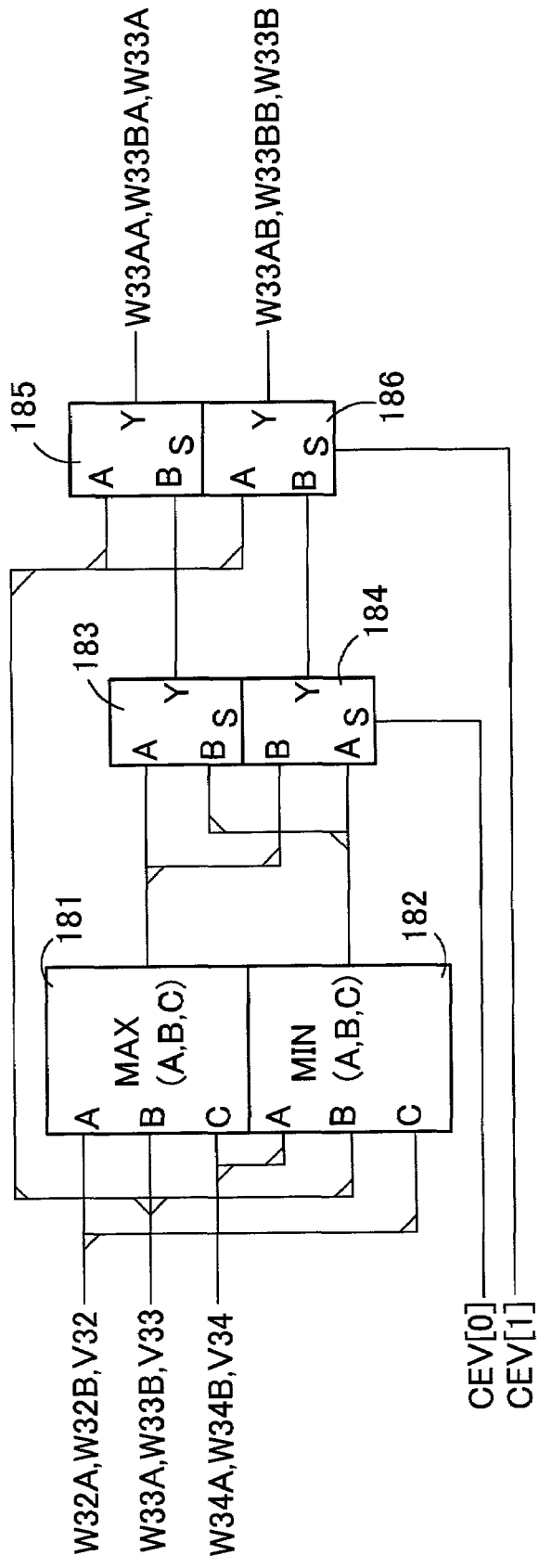
FIG. 21 shows the partial structure of a resolution converting section.

Next, the resolution converting section 18 will be described. In accordance with an evaluation at the edge characteristic evaluating section 17, the resolution converting section 18 conducts computation of image data for each pixel obtained in case resolution of the target pixel is enhanced with respect to the main-scanning direction. For example, provided that the target pixels are W33A and W33B, the resolution converting section 18 conducts computation of image data for W33AA, W33AB, W33BA and W33BB. The resolution converting section 18 is equipped with two processing circuits consisting of two arithmetic operators 81, 82 and four selectors 83, 84, 85, 86. That is, provided that target pixels are W33A and W33B, the resolution converting section 18 is equipped with two processing circuits as shown in FIG. 21 so as to conduct resolution processing for the two target pixels in parallel. In FIG. 21, input values to be inputted in the processing circuits for conversion processing of the pixel W33A are shown as a typical example.

Both the arithmetic operators 181 and 182 have three input terminals A, B, C. Image data for the target pixel and two pixels adjacent to the target pixel in the sub-scanning direction are inputted to these three terminals. For example, provided that one of the target pixels is W33A, image data corresponding to pixels W32A, W33A, and W34A inputted to the terminals A, B, and C, respectively.

From the arithmetic operator 181, a maximum value among the three values inputted to the terminals A, B, and C is outputted. The output from the arithmetic operator 181 is inputted to the terminal A for the selector 183 and the terminal B for the selector 184. On the other hand, from the arithmetic operator 182, a minimum value among the three values inputted to the terminals A, B, and C is outputted. The output from the arithmetic operator 182 is inputted to the terminal B for the selector 183 and the terminal A for the selector 184.

Other than terminals A and B, the selectors 183 and 184 have select signal inputting terminals S. A signal CEV[0], the lower significant bit signal of the evaluation signals outputted from the patterns comparator 173, is inputted to the select signal inputting terminals S. In case the signal CEV[0] to be outputted to the their terminals S is [0], the selectors 183, 184 output an input value for the terminals A. In case the signal CEV[0] is [1], the selectors 183,184 output an input value for the terminals B.

That is, in case the input signal CEV[0] to be transmitted to the terminal S is [0] (a case of normal edge or moved-leftward edge), the selector 183 outputs a maximum value of image data to be inputted to the arithmetic operator 181 whereas the selector 184 outputs a minimum value of image data to be inputted to the arithmetic operator 182. Furthermore, in case the input signal CEV[0] to be transmitted to the terminal S is [1] (a case of moved-rightward edge), the selector 183 outputs a minimum value of image data to inputted to the arithmetic operator 181 whereas the selector 184 outputs a maximum value of image data to be inputted to the arithmetic operator 182. Data thus outputted from the selectors 183, and 184 are inputted to the input terminals B of the selectors 185, and 186, respectively.

On the other hand, image data of each target pixel is inputted to both the input terminals A for the selectors 185 and 186. Furthermore, a signal CEV[1], the more significant bit signal of the evaluation signals outputted from the patterns comparator 173, is inputted to the select signal inputting terminals S for the selectors 185 and 186. In case the signal CEV[1] to be outputted to the their terminals S is [0], the selectors 185, 186 output an input value for the terminals A. In case the signal CEV[1] is [1], the selectors 185, 186 output an input value for the terminals B. That is, in case the input signal CEV[1] to be transmitted to the terminal S is [0] (a case of normal edge), both the selectors 185 and 186 output image data for the target pixel. Furthermore, in case the input signal CEV[1] to be transmitted to the terminal S is [1] (a case of moved-leftward edge or moved-rightward edge), the selector 185 outputs output data transmitted from the selector 183 whereas the selector 186 outputs output data transmitted from the selector 184.

Provided that one of the target pixels is W33A, owing to the structure as described in the above, the resolution converting section 18 can obtain outputs such as described in the following paragraph in accordance with an evaluation results obtained by the edge characteristic evaluating section 17 with respect to image patterns of W22B, W23B, W24B, W32A, W34A, W32B, W33B, and W34B, the eight adjacent pixels for the target pixel W33A.

Figure 22A:
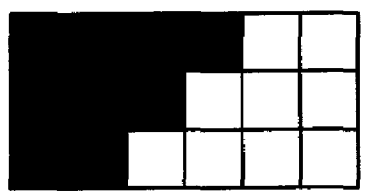
FIG. 22 shows an example of processing result (moved-leftward pattern) obtained at a main-scanning-directional second resolution converting section.
Figure 22B:
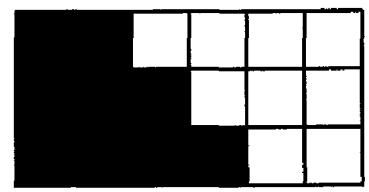
Figure 23A:
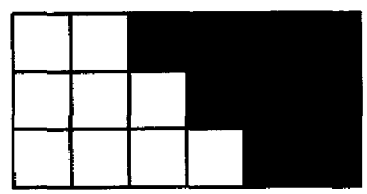
FIG. 23 shows an example of processing result (moved-rightward pattern) obtained at the main-scanning-directional second resolution converting section.
Figure 23B:
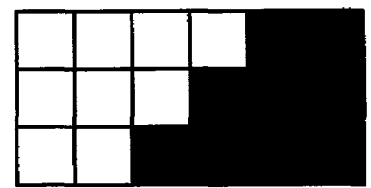

That is, in case the edge characteristic evaluating section 17 evaluates image patterns as "moved-leftward pattern", the resolution converting section 18 outputs image data having the highest gradation value among the image data for the pixels W32A, W33A, and W34A as the image data corresponding to the pixel W33AA. As the image data corresponding to the pixel W33AB, the resolution converting section 18 outputs image data having the lowest gradation value among the image data for the pixels W32A, W33A, and W34A. As a result, image data such as shown in FIGS. 22A, and 22B are obtained. On the other hand, in case the edge characteristic evaluating section 17 evaluates image patterns as "moved-rightward pattern", the resolution converting section 18 outputs image data having the lowest gradation value among the image data for the pixels W32A, W33A, and W34A corresponding to the pixel W33AA. As the image data corresponding to the W33AB, the resolution converting section 18 outputs image data having the highest gradation value among the image data for the pixels W32A, W33A, and W34A. As a result, image data such as shown in FIGS. 23A, and 23B are obtained.

Let us revert to FIG. 1 again. The main-scanning-directional-image-data outputting section 16 selects either image data outputted from the main-scanning-directional first resolution converting section 14 or image data from the main-scanning-directional second resolution converting section 15. The image data selection depends on a discrimination result obtained by the main-scanning-directional region discriminating section 13. Specifically, as to pixels the main-scanning-directional region discriminating section 13 evaluates as edge region, the main-scanning-directional-image-data outputting section 16 selects image data outputted from the main-scanning-directional second resolution converting section 15. As to pixels the main-scanning-directional region discriminating section 13 evaluates as non-edge region, the main-scanning-directional-image-data outputting section 16 selects image data outputted from the main-scanning-directional first resolution converting section 14. Image data outputted from the main-scanning-directional-image-data outputting section 16 is inputted to a printer or the like as output image data, which is the final output image data to be outputted on paper or the like.

Figure 24:
FIG. 24 shows an original image.

Next, description will be given with respect to an image processing method of the image processing apparatus 1 structured such as the above. As an example of the method, a case of image processing of an original image shown in FIG. 24 will be described hereinafter. It should be noted that resolution of the original image is 600×600 dpi.

Firstly, an original image is readout by a scanner or the like and image data obtained is inputted to the image processing apparatus 1. The image data inputted to the image processing apparatus 1 is converted into raster type data structure such as shown in FIG. 2 by the FIFO memory 2. The image data converted into raster type data structure is inputted to the sub-scanning-directional-region discriminating section 3, the sub-scanning-directional first resolution discriminating section 3, and the sub-scanning-directional second resolution discriminating section 5, respectively.

Region discrimination processing is conducted for image data inputted to the sub-scanning-directional-region discriminating section 3. That is, the sub-scanning-directional-region discriminating section 3 discriminates whether or not each pixels for the original image data belongs to edge region with respect to the sub-scanning direction. On the other hand, the image data inputted to the sub-scanning-directional first resolution converting section 4 is inputted to the sub-scanning-directional-image-data outputting section 6 with its resolution being doubled in the sub-scanning direction. Furthermore, for image data inputted to the sub-scanning-directional second resolution converting section 5, the edge characteristic evaluating section 7 evaluates its edge characteristic. Specifically, in case its edge characteristic coincides with a predetermined pattern, it is evaluated as moved-upward edge or moved-downward edge. In case not coincide with the predetermined pattern, it is evaluated as normal edge. In accordance with an evaluation result obtained by the edge characteristic evaluating section 7, the resolution converting section 8 conducts resolution conversion processing to double the resolution of image data in the sub-scanning direction. The image data processed by the resolution converting section 8 is inputted to the sub-scanning-directional-image-data outputting section 6.

It should be noted that two kinds of image data have been inputted in the sub-scanning-directional-image-data outputting section 6, so far. One of them is image data of the original image with its resolution doubled. The other one is image data of the original image resolution of which is doubled in accordance with an evaluation result of its edge characteristic. Resolution of these two type of image data is 600×1200 dpi. This is because resolution of these image data is just double in the sub-scanning direction.

Next, the sub-scanning-directional-image-data outputting section 6 selects either the image data outputted from the sub-scanning-directional first resolution converting section 4 or the image data from the sub-scanning-directional second resolution converting section 5. Appropriate image is selected in accordance with an evaluation result obtained by the sub-scanning-directional-region discriminating section 3. Specifically, in case of a pixel evaluated as edge region by the sub-scanning-directional-region discriminating section 3, image data to be outputted from the sub-scanning-directional second resolution converting section 5 is selected by the sub-scanning-directional-image-data outputting section 6. On the other hand, in case of a pixel evaluated as non-edge region, image data to be outputted from the sub-scanning-directional first resolution converting section 4 is selected. After processed by the FIFO memory 12, the image data selected by the sub-scanning-directional-image-data outputting section 6 is inputted into the main-scanning-directional-region discriminating section 13, the main-scanning-directional first resolution converting section 14, and the main-scanning-directional second resolution converting section 15, respectively.

Next, region discrimination processing is conducted for image data inputted to the main-scanning-directional-region discriminating section 13. That is, main-scanning-directional-region discriminating section 13 discriminates whether or not each pixel for the image data outputted from the sub-scanning-directional-image-data outputting section 6 belongs to edge region with respect to the main-scanning direction. On the other hand, the image data inputted to the main-scanning-directional first resolution converting section 14 is inputted to the main-scanning-directional-image-data outputting section 16 with its resolution being doubled in the main-scanning direction. Furthermore, for image data inputted to the main-scanning-directional second resolution converting section 15, the edge characteristic evaluating section 17 evaluates its edge characteristic. Specifically, in case its edge characteristic coincides with a predetermined pattern, it is evaluated as moved-leftward edge or moved-rightward edge. In case not coincide with the predetermined pattern, it is evaluated as normal edge. In accordance with an evaluation result obtained by the edge characteristic evaluating section 17, the resolution converting section 18 conducts resolution conversion processing to double the resolution of image data in the main-scanning direction. The image data processed by the resolution converting section 18 is inputted to the main-scanning-directional-image-data outputting section 16.

It should be noted that two kinds of image data have been inputted in the main-scanning-directional-image-data outputting section 16, so far. One of them is image data outputted from the sub-scanning-directional-image-data outputting section 6 with its resolution double in the main-scanning direction. The other one is image data outputted from the sub-scanning-directional-image-data outputting section 6, resolution of which is doubled in the main-scanning direction in accordance with an evaluation result of its edge characteristic. Resolution of these two type of image data is 1200×1200 dpi.

Figure 25:
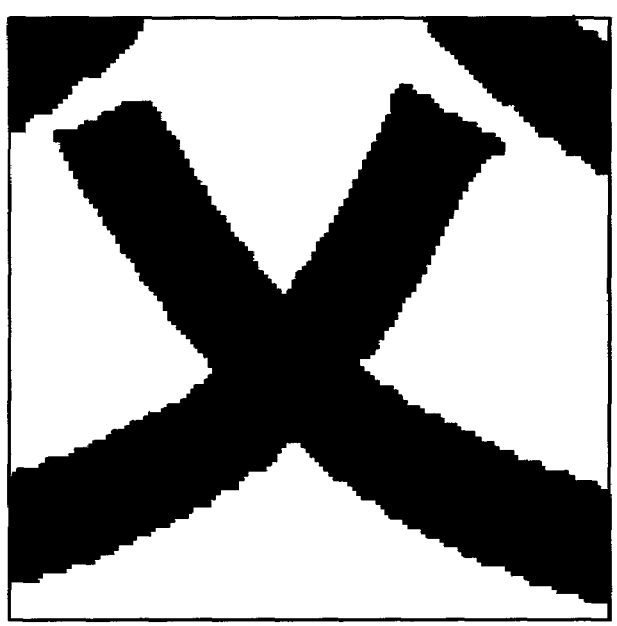
FIG. 25 shows a resultant image after image processing.

Then, the main-scanning-directional-image-data outputting section 16 selects either the image data outputted from the main-scanning-directional first resolution converting section 14 or the image data from the main-scanning-directional second resolution converting section 15. Appropriate image is selected in accordance with an evaluation result obtained by the main-scanning-directional-region discriminating section 13. Specifically, in case of a pixel evaluated as edge region by the main-scanning-directional-region discriminating section 13, image data to be outputted from the main-scanning-directional second resolution converting section 15 is selected by the main-scanning-directional-image-data outputting section 16. On the other hand, in case of a pixel evaluated as non-edge region, image data to be outputted from the main-scanning-directional first resolution converting section 14 is selected. Image data selected at the main-scanning-directional-image-data outputting section 16 corresponds to an output from the image processing apparatus 1. The data for output is inputted to a printer or the like. Thereby, an output image such as shown in FIG. 25 is formed. As apparent from FIG. 25, the image to which image processing is applied is a high-quality image resolution of which is enhanced compared with the original image.

As described, according to the image processing apparatus 1 of the First Embodiment, for enhancing resolution of image data with respect to the sub-scanning direction, the sub-scanning-directional first resolution converting section 4 and the sub-scanning-directional second resolution converting section 5 are provided and for enhancing resolution of image data with respect to the main-scanning direction, the main-scanning-directional first resolution converting section 14 and the main-scanning-directional second resolution converting section 15 are provided. Thereby, a high-quality output image can be obtained. The image processing apparatus 1 is structured such as the above so that resolution conversion processing can be applied to the image data with respect to the sub-scanning direction and the main-scanning direction independently.

Furthermore, in the image processing apparatus 1, as for a pixel evaluated as edge region by the sub-scanning-directional region discriminating section 3, image data, to which resolution conversion processing with respect to the sub-scanning direction is applied at the sub-scanning-directional second resolution converting section 5 based on the edge characteristic evaluation, is outputted from the sub-scanning-directional-image-data outputting section 6. Further on, as for a pixel evaluated as edge region by the main-scanning-directional region discriminating section 13, image data, to which resolution conversion processing with respect to the main-scanning direction is applied at the main-scanning-directional second resolution converting section 15 based on the edge characteristic evaluation, is outputted from the main-scanning-directional-image-data outputting section 16. The image data outputted from the main-scanning-directional-image-data outputting section 16 corresponds to an output of the image processing apparatus 1. An appropriate manner of resolution conversion processing is changed depending on whether each pixel of image data belongs to edge region or not. As a result, image data, to which resolution conversion processing appropriate for characteristic of each pixel is applied, is selected and finally outputted. Thereby, more high-quality output image can be obtained.

(Second Embodiment)

Figure 26:
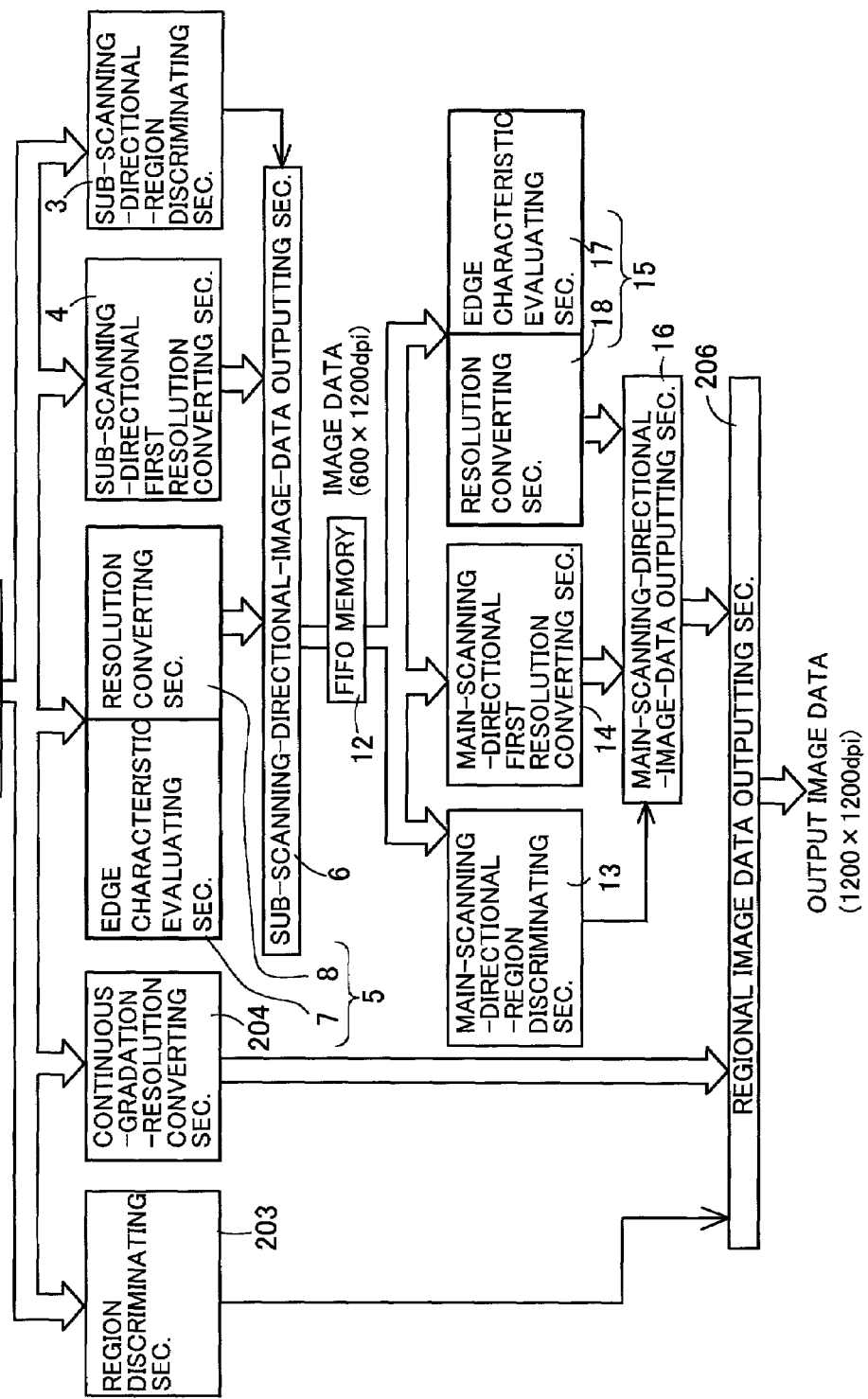
FIG. 26 shows a block diagram schematically showing the structure of an image processing apparatus directed to a Second Embodiment.

Next, a Second Embodiment will be described. An image processing apparatus directed to the Second Embodiment can obtain a high-quality output image even for the case of an image consisting of character region and picture region. That is, as shown in FIG. 26, other than the processing sections directed tot the First Embodiment, an image processing apparatus 200 directed to this embodiment further includes a region discriminating section 203, a continuous-gradation-resolution converting section 204, and a regional image data outputting section 206. Therefore, in this embodiment, processing sections different from those of the First Embodiment will be described hereafter. As for processing sections structured similar to those of the First Embodiment, the same numerals are assigned thereto and description will be omitted.

Figure 27:
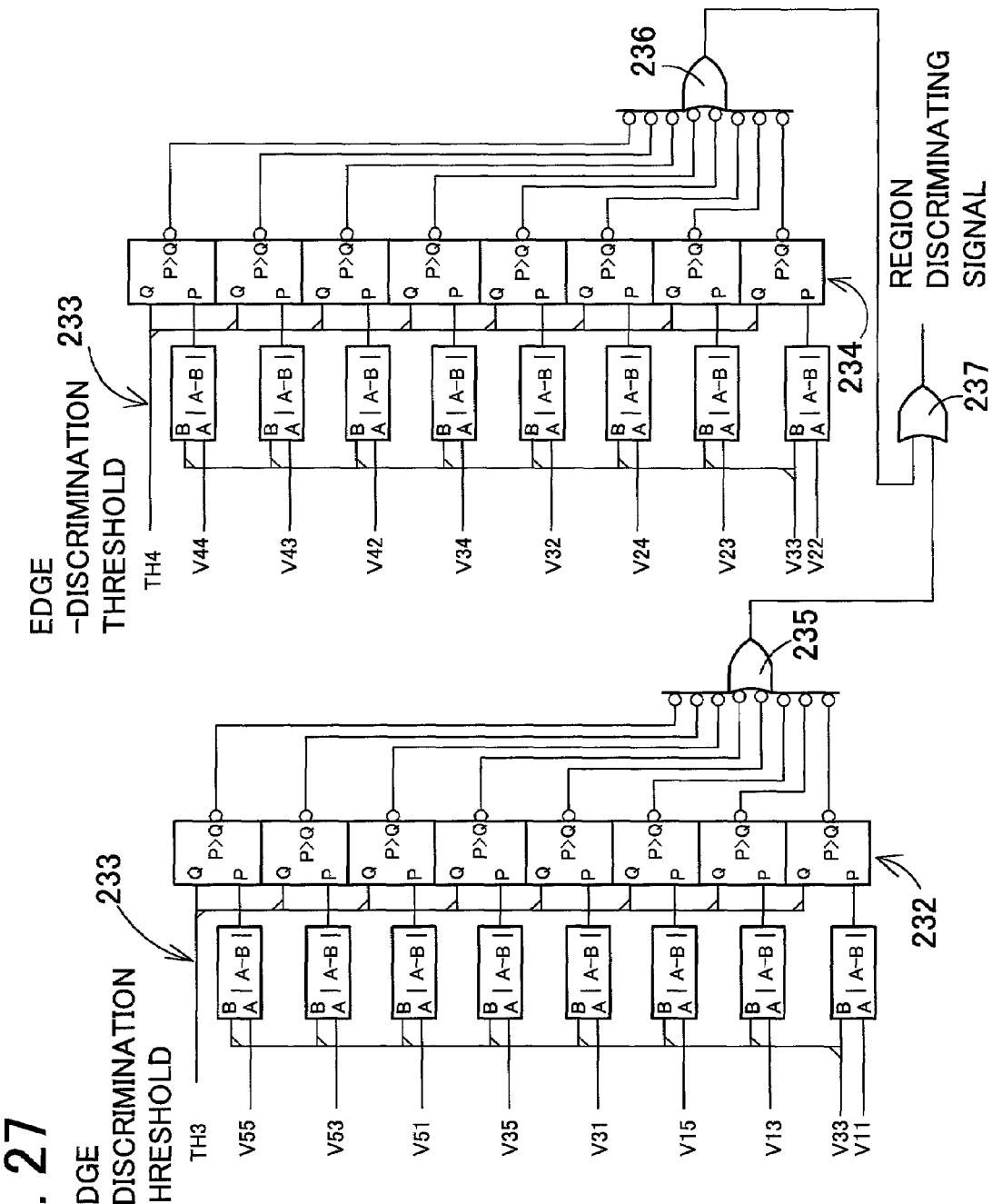
FIG. 27 shows the structure of a region discriminating section.

The region discriminating section 203 discriminates whether each pixel for an original image belongs to edge region or continuous gradation region. A size of discrimination at the region discriminating section 203 is 5×5 dots. As shown in FIG. 27, the region discriminating section 203 consists of eight subtracters 231, eight comparators 233, eight subtracters 234, and three OR circuits 235, 236, 237.

As for the input image data of FIG. 2, image data of the target pixel (V33) and eight pixels (V11, V13, V15, V31, V35, V51, V53, and V55), two-dot distance away from the target pixel V33, are inputted into each of the subtracters 231. An edge-discrimination threshold TH3 and outputs from each of the subtracters 231 are inputted into each of the comparators 232. Outputs from each of the comparators 232 are inputted to the OR circuit 235.

Similarly, image data of the target pixel (V33) and the eight pixels (V22, V23, V24, V32, V34, V42, V43, and V44) are inputted into each of the subtracters 233. An edge-discrimination threshold TH4 and outputs from each of the subtracters 233 are inputted into each of the comparators 234. Outputs from each of the comparators 234 are inputted to the OR circuit 236. Furthermore, an output from the OR circuit 235 and an output from the OR circuit 236 are inputted to the OR circuit 237. The output from the OR circuit 237 corresponds to a region discrimination signal.

The region discriminating section 203 structured such as the above makes region discrimination such as follows. That is, when at least one of the gradation differences between the target pixel (V33) and eight pixels (V11, V13, V15, V31, V35, V51, V53, and V55) two-dot distance away from the target pixel V33 exceeds the edge-discrimination threshold TH3, it is discriminated that the target pixel V33 belongs to an edge region. When at least one of the gradation differences between the target pixel (V33) and its eight adjacent pixels (V22, V23, V24, V32, V34, V42, V43, V44) exceeds the edge-discrimination threshold TH4, it is also discriminated that the target pixel V33 belongs to edge region. Contrary, in case both of the following two conditions are satisfied, the target pixel V33 is discriminated as a pixel belonging to a continuous gradation region. The first condition is that none of the eight gradation differences between the target pixel (V33) and eight pixels (V11, V13, V15, V31, V35, V51, V53, and V55) two-dot distance away from the target pixel V33 exceeds the edge-discrimination threshold TH3. The second condition is that none of the gradation differences between the target pixel (V33) and its eight adjacent pixels (V22, V23, V24, V32, V34, V42, V43, V44) exceeds the edge-discrimination threshold TH4.

Figure 28:
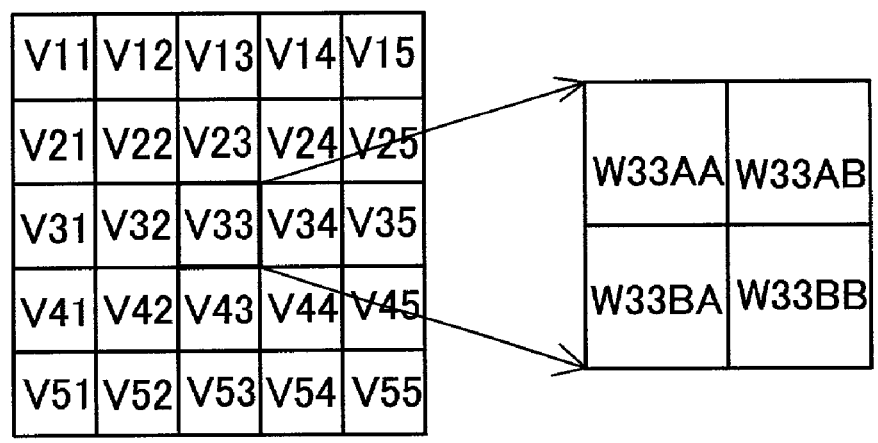
FIG. 28 shows an example of data structure after a continuous-gradation-resolution converting section applies resolution conversion processing to image data.
Figure 29:
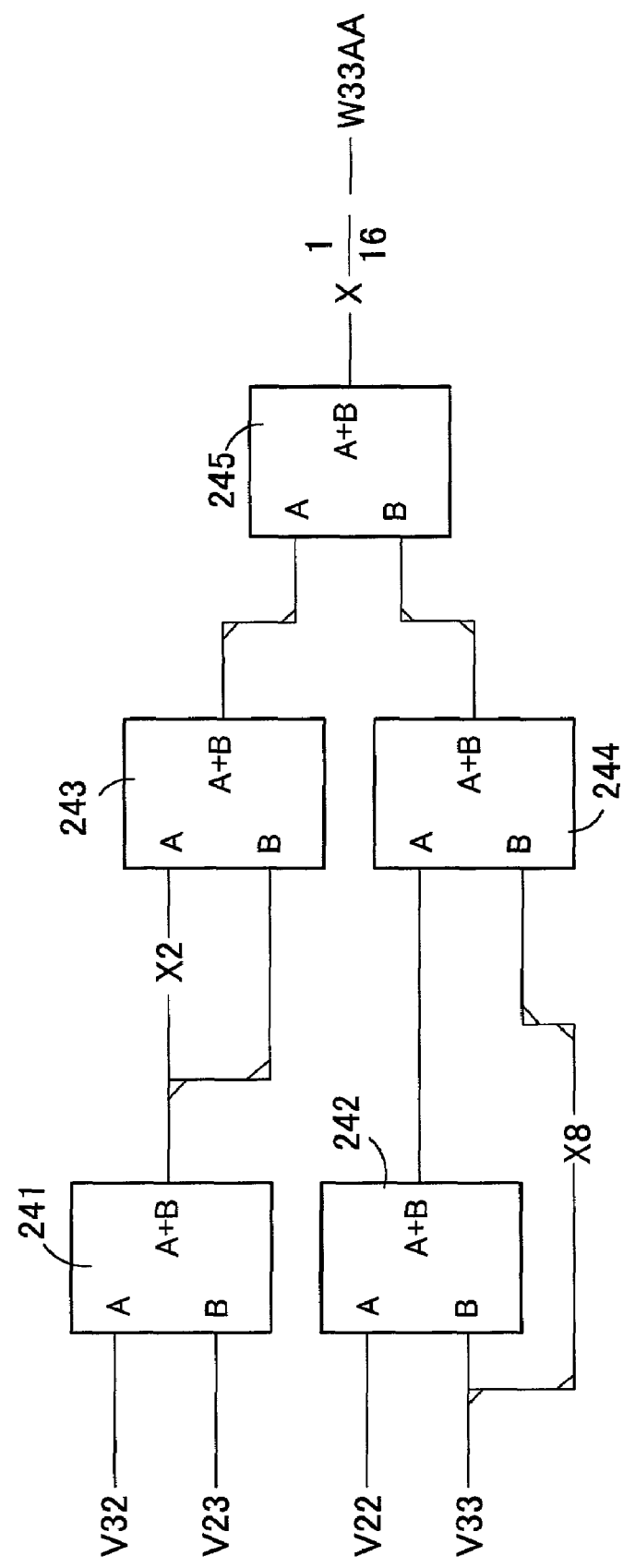
FIG. 29 shows the partial structure of the continuous-gradation-resolution converting section.

Let us revert to FIG. 26. The continuous-gradation-resolution converting section 204 doubles resolution of image data with respect to both the main-scanning direction and the sub-scanning direction. That is, as shown in FIG. 28, provided that a target pixel is V33, the target pixel V33 is divided and converted into four pixels W33AA, W33AB, W33BA, and W33BB. The continuous-gradation-resolution converting section 204 is equipped with four processing circuits each of which consists of five adder 241, 242, 243, 244, 245 such as shown in FIG. 29. Since the four processing circuits are structured similarly, only the processing circuit to output image data of W33AA will be described hereinafter.

Each of the adders 241 through 245 has input terminals A and B. The four adders are designed to output sums of their input value (A+B) as calculation result. Image data of the pixel V32 and pixel V23 are inputted to the terminal A and terminal B of the adder 241, respectively. Image data of the pixel V22 and pixel V33 are inputted to the terminal A and terminal B of the adder 242, respectively. Data corresponding to what the output from the adder 241 is doubled and output data from the adder 241 are inputted to the terminal A and terminal B of the adder 243, respectively. Output data from the adder 242 and data corresponding to what data of the pixel V33 is octploid are inputted to the terminal A and terminal B of the adder 244, respectively. Further on, output data from the adder 243 and output from the adder 244 are inputted to the terminal A and terminal B of the adder 245, respectively. Data what is made one-sixteenth time of the output from the adder 245 corresponds to image data of W33AA. That is, the image data of W33AA is calculated with the following expression.

$$W33AA=(9\times V33+3\times V32+3\times V23+V22)/16$$

In case of calculating image data of W33AB, input values for terminals A of the adder 241 and 242 may be replaced such as follows: V32→V34 (adder 241); and V22→V24 (adder 242). In case of image data of W33BA, input values for terminal B of the adder 241 and terminal A of the adder 242 may be replaced such as follows: V23→V43 (adder 241); and V22→V42 (adder 242). In case of image data of W33BB, input values for terminals A and B for each of the adder 241 and 242 may be replaced such as follows: V32→V34 (terminal A for adder 241); V22→V44 (terminal A for the adder 242); and V23→V43 (terminal B for adder 241).

Let us revert to FIG. 26 again. The regional image data outputting section 206 selects either image data outputted from the main-scanning-directional-image-data outputting section 16 or image data from the continuous-gradation-resolution converting section 204. The image data selection depends on a discrimination result obtained by the region discriminating section 203. Specifically, as to pixels the region discriminating section 203 evaluates as edge region, the regional image data outputting section 206 selects image data outputted from the main-scanning-directional-image-data outputting section 16. As to pixels the region discriminating section 203 evaluates as continuous gradation region, the regional image data outputting section 206 selects image data outputted from the continuous-gradation-resolution converting section 204. Image data outputted from the regional image data outputting section 206 is inputted to a printer or the like as output image data, which is the final output image data to be outputted on paper or the like.

Next, description will be given with respect to an image processing method of the image processing apparatus 200 structure such as the above. It should be noted that resolution of the original image is 600×600 dpi.

Firstly, an original image is readout by a scanner or the like and image data obtained is inputted to the image processing apparatus 200. The image data inputted to the image processing apparatus 200 is converted into raster type data structure such as shown in FIG. 2 by the FIFO memory 2. The image data converted into raster type data structure is inputted to the sub-scanning-directional-region discriminating section 3, the sub-scanning-directional first resolution converting section 4, the sub-scanning-directional second resolution converting section 5, the region discriminating section 203, and the continuous-gradation-resolution converting section 204 respectively.

Processing conducted in the same manner of the First Embodiment is applied to the image data inputted to the sub-scanning-directional-region discriminating section 3, the sub-scanning-directional first resolution converting section 4, and the sub-scanning-directional second resolution converting section 5. Thereby, the image data of 1200×1200 dpi outputted from the main-scanning-directional-image-data outputting section 16 is inputted to the region image data outputting section 206.

Furthermore, resolution of the image data outputted to the continuous-gradation-resolution converting section 204 is doubled in both the main-scanning direction and the sub-scanning direction by the continuous-gradation-resolution converting section 204. The image data resolution of which is doubled by the continuous-gradation-resolution converting section 204, i.e., 1200×1200 dpi, is inputted to the region image data outputting section 206.

On the other hand, the region discriminating section 203 discriminates whether each pixel of the input image data belongs to edge region or continuous gradation region. A discrimination result obtained by the region discriminating section 203 is inputted to the region image data outputting section 206.

Then, the region image data outputting section 206 selects either the image data outputted from the main-scanning-directional-image-data outputting section 16 or the image data outputted from the continuous-gradation-resolution converting section 204. Appropriate image is selected in accordance with an evaluation result obtained by the region discriminating section 203. Specifically, in case of a pixel evaluated as edge region by the region discriminating section 203, image data to be outputted from the main-scanning-directional-image-data outputting section 16 is selected by the region image data outputting section 206. On the other hand, in case of a pixel evaluated as continuous gradation region by the region discriminating section 203, image data to be outputted from the continuous-gradation-resolution converting section 204 is selected. Image data selected at the region image data outputting section 206 corresponds to output data from the image processing apparatus 200. The output data is inputted to a printer or the like and an output image is formed.

Since the image processing apparatus 200 is equipped with the region discriminating section 203, the continuous-gradation-resolution converting section 204, and the region image data outputting section 206, among input image data, a pixel belonging to continuous gradation region can receive resolution conversion processing different from resolution conversion processing applied to a pixel belonging to edge region. Therefore, with respect to both picture region and character region, a high-quality output image with high resolution can be obtained. Accordingly, even for the case of image data consisting of picture region and character region, a high-quality output image can be obtained.

As described, according to the image processing apparatus 200 of the Second Embodiment, for enhancing resolution of image data with respect to the sub-scanning direction, the sub-scanning-directional first resolution converting section 4 and the sub-scanning-directional second resolution converting section 5 are provided and for enhancing resolution of image data with respect to the main-scanning direction, the main-scanning-directional first resolution converting section 14 and the main-scanning-directional second resolution converting section 15 are provided. Thereby, resolution conversion processing can be applied to the image data with respect to the sub-scanning direction and the main-scanning direction independently, so that a high-quality output image can be obtained.

Furthermore, in the image processing apparatus 200, as for a pixel evaluated as edge region by the sub-scanning-directional region discriminating section 3, image data, to which resolution conversion processing with respect to the sub-scanning direction is applied at the sub-scanning-directional second resolution converting section 5 based on the edge characteristic evaluation, is outputted from the sub-scanning-directional-image-data outputting section 6. Further on, as for a pixel evaluated as edge region by the main-scanning-directional region discriminating section 13, image data, to which resolution conversion processing with respect to the main-scanning direction is applied at the main-scanning-directional second resolution converting section 15 based on the edge characteristic evaluation, is outputted from the main-scanning-directional-image-data outputting section 16. An appropriate manner of resolution conversion processing is changed depending on whether each pixel of image data belongs to edge region or not. As a result, image data, to which resolution conversion processing appropriate for characteristic of each pixel is applied, is outputted. Thereby, more high-quality output image can be obtained.

Furthermore, the image processing apparatus 200 is equipped with the region discriminating section 203, the continuous-gradation-resolution converting section 204, and the region image data outputting section 206. Thereby, among input image data, a pixel belonging to continuous gradation region can receive resolution conversion processing different from resolution conversion processing applied to a pixel belonging to edge region. Accordingly, even for the case of image data consisting of picture region and character region, a high-quality output image can be obtained.

(Third Embodiment)

Figure 30:
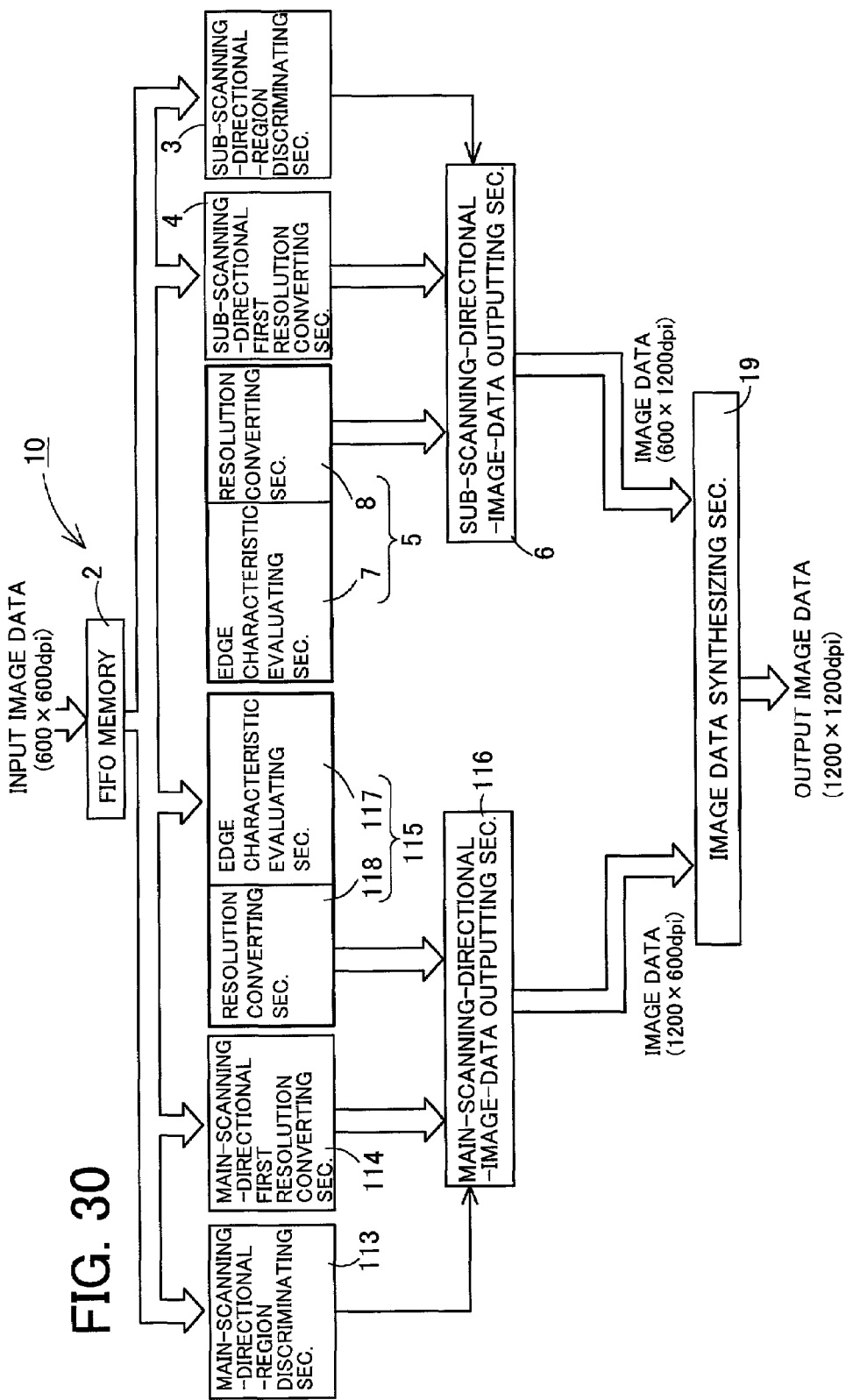
FIG. 30 shows a block diagram schematically showing the structure of an image processing apparatus directed to a Third Embodiment.

Next, a Third Embodiment will be described hereafter. As shown in FIG. 30, an image processing apparatus 10 includes: an FIFO memory 2; a sub-scanning-directional region discriminating section 3; a sub-scanning-directional first resolution converting section 4; a sub-scanning-directional second resolution converting section 5; a sub-scanning-directional-image-data outputting section 6; a main-scanning-directional-region discriminating section 113; a main-scanning-directional first resolution converting section 114; a main-scanning-directional second resolution converting section 115; a main-scanning-directional-image-data outputting section 116; and an image data synthesizing section 19. The main-scanning-directional second resolution converting section 115 consists of an edge characteristic evaluating section 117 and a resolution converting section 118. In this embodiment, as for processing sections structured similar to those of the First Embodiment, the same numerals are assigned thereto and descriptions for the identical sections will be omitted.

As shown in FIG. 30, image data the FIFO memory 2 has converted into raster type data structure is to be inputted into the sub-scanning-directional-region discriminating section 3, the sub-scanning-directional first resolution converting section 4, the sub-scanning-directional second resolution converting section 5, the main-scanning-directional-region discriminating section 113, the main-scanning-directional first resolution converting section 114, and the main-scanning-directional second resolution converting section 115, respectively.

In the image processing apparatus 10, image processing with respect to a sub-scanning direction is conducted by collaboration of the sub-scanning-directional-region discriminating section 3, the sub-scanning-directional first resolution converting section 4, the sub-scanning-directional second resolution converting section 5, and the sub-scanning-directional-image-data outputting section 6. These four processing sections themselves work in the same manner as the corresponding sections of the First Embodiment. The only difference is that image data outputted from the sub-scanning-directional-image-data outputting section 6 is inputted to the image data synthesizing section 19.

Next, sections to conduct image processing with respect to the main-scanning direction, namely, the main-scanning-directional-region discriminating section 113, the main-scanning-directional first resolution converting section 114, the main-scanning-directional second resolution converting section 115, and the main-scanning-directional-image-data outputting section 116 will be described.

The main-scanning-directional-region discriminating section 113 discriminates whether each pixel of input image data belongs to an edge region or not just with respect to the main-scanning direction. For example, as for the target pixel V33 (see FIG. 2), region discrimination with respect to the main-scanning direction is conducted using pixels V32 and V34 adjacent to V33. The main-scanning-directional region discriminating section 113 has a processing circuit shown in FIG. 15.

That is, provided that a target pixel is V33, image data of a pixel V32 and that of a pixel V33 are inputted to the input terminal A and the input terminal B for the subtracter 131, respectively. As for the subtracter 132, image data of V34 and that of V33 are inputted to its input terminal A and input terminal B, respectively. As for the subtracter 133, image data of V33 and that of V32 are inputted to its input terminal A and input terminal B, respectively. As for the subtracter 134, image data of V33 and that of V34 are inputted to its input terminal A and input terminal B, respectively.

Accordingly, the subtracter 131 outputs a difference (V32–V33). The subtracter 132 outputs a difference (V34–V33). The subtracter 133 outputs a difference (V33–V32). The subtracter 134 outputs a difference (V33–V34).

Outputs of the subtracters 131, 132, 133, and 134 are inputted to input terminals P of comparators 135, 136, 137, and 138, respectively. An edge-discrimination threshold TH2 is inputted to input terminals Q of respective comparators 135, 136, 137, and 138. Thereby, each of the comparators 135 through 138 is designed to output a comparison result (P>Q or not). Outputs of comparison results obtained by the comparators 135 through 138 are inputted to the OR circuit 139. Then, an output from the OR circuit 139 corresponds to a main-scanning-directional-edge signal.

The main-scanning-directional region discriminating section 13 structured such as above makes region discrimination such as follows. When at least one of the gradation differences between the target pixel (V33) and its adjacent pixels (V32, V34), exceeds the edge-discrimination threshold TH2, it is discriminated that the target pixel belongs to an edge region. On the other hand, when none of the gradation differences exceeds the edge-discrimination threshold TH2, it is discriminated that a pixel does not belong to an edge region.

Let us revert to FIG. 30. The main-scanning-directional first resolution converting section 114 conducts processing for enhancing resolution of input image data with respect to the main-scanning direction. More specifically, the main-scanning-directional first resolution converting section 114 converts a data structure of input image data shown in FIG. 2 into a data structure shown in FIG. 31. That is, for each pixel, the number of data is doubled in the main-scanning direction.

The main-scanning-directional first resolution converting section 114 is equipped with a processing circuit consisting of two arithmetic operators 141 and 142 shown in FIG. 17.

Provided that a target pixel is V33, image data of a pixel V33 and that of a pixel V32 are inputted to the input terminal A and the input terminal B for the arithmetic operator 141, respectively. As for the arithmetic operator 142, image data of V33 and that of V34 are inputted to its input terminal A and input terminal B, respectively. An output of the arithmetic operator 141 and that of the arithmetic operator 142 correspond to image data of pixel W33A and pixel W33B, respectively. That is, the target pixel V33 is divided into two pixels W33A and W33B. Thereby, the number of data for the pixel V33 is doubled.

Let us revert to FIG. 30 again. The main-scanning-directional second resolution converting section 115 evaluates edge characteristic of image data with respect to the main-scanning direction and conducts resolution conversion processing to enhance resolution with respect to the main-scanning direction based on the evaluation result. Therefore, the main-scanning-directional second resolution converting section 115 is equipped with the edge characteristic evaluating section 117 and the resolution converting section 118.

Firstly, the structure of the edge characteristic evaluating section 117 will be described. The edge characteristic evaluating section 117 evaluates edge characteristic of image data which is to be inputted to the main-scanning-directional second resolution converting section 115 with respect to the main-scanning direction. The edge characteristic evaluating section 117 is equipped with a processing circuit consisting of eight subtracters 171, eight comparators 172 and a pattern comparator 173 shown in FIG. 18. Each of the subtracters 171 calculates gradation differences (D22, D23, D24, D32, D34, D42, D43, D44) between the target pixel (V33) and its eight adjacent pixels (V22, V23, V24, V32, V34, V42, V43, V44).

Then, comparison results with respect to the gradation differences between the target pixel (V33) and its eight adjacent pixels (V22, V23, V24, V32, V34, V42, V43, V44) and the characteristic evaluating threshold Eth are inputted to the pattern comparator 173. In the pattern comparator 173, "moved-leftward pattern" shown in FIGS. 32A and 32B and "moved-rightward pattern" shown in FIGS. 33A and 33B are stored. The pattern comparator 173 discriminates whether or not image patterns to which bi-level processing applied with respect to the target pixel and the eight adjacent pixels coincide with either the "moved-leftward pattern" or the "moved-rightward pattern". In case it is discriminated that an image pattern coincides with the "moved-leftward pattern", the target pixel is evaluated as "moved-leftward edge". In case it is discriminated that an image pattern coincides with the "moved-rightward pattern", the target pixel is evaluated as "moved-rightward edge". In case an image pattern coincides with neither the "moved-leftward pattern" nor the "moved-rightward pattern", the target pixel is evaluated as "normal edge". Then, an outputted signal is inputted to the resolution converting section 118.

Next, the structure of the resolution converting section 118 will be described. In accordance with an evaluation at the edge characteristic evaluating section 117, the resolution converting section 118 conducts computation of image data for each pixel obtained in case resolution of the target pixel is enhanced with respect to the main-scanning direction. For example, provided that the target pixel is V33, the resolution converting section 118 conducts computation of image data for pixels W33A and W33B. The resolution converting section 118 is equipped with one processing circuit consisting of two arithmetic operators 181, 182 and four selectors 183, 184, 185, 186 as shown in FIG. 21. Provided that a target pixel is v33, image data of a pixel v32, that of a pixel V33, and that of V34 are inputted to the input terminal A, the input terminal B, and the input terminal C for the arithmetic operator 181, respectively. Similarly, as for the arithmetic operator 182, image data of a pixel V34, that of a pixel V33, and that of V32 are inputted to the input terminal A, the input terminal B, and the input terminal C, respectively. Then, image data outputted from the selectors 185 and 186 correspond to output data from the resolution converting section 118 (the main-scanning-directional second resolution converting section 115).

Provided that a target pixels is V33, owing to the structure as described in the above, the resolution converting section 118 can obtain outputs such as described in the following paragraph in accordance with an evaluation results obtained by the edge characteristic evaluating section 117 with respect to image patterns of V22, V23, V24, V32, V34, V42, V43, and V44, the eight adjacent pixels for the target pixel V33.

Figure 34A:
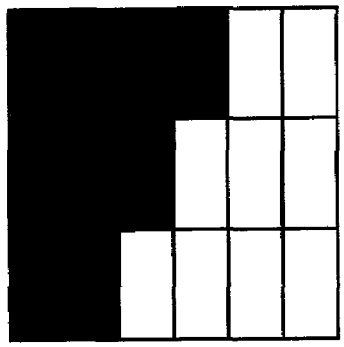
FIG. 34 shows an example of processing result (moved-leftward pattern) obtained at a main-scanning-directional second resolution converting section.
Figure 34B:
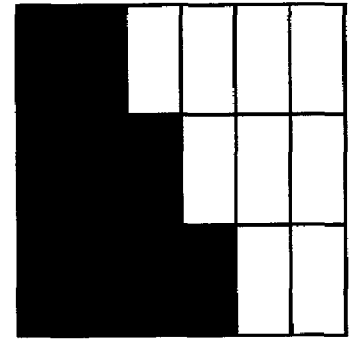
Figure 35A:
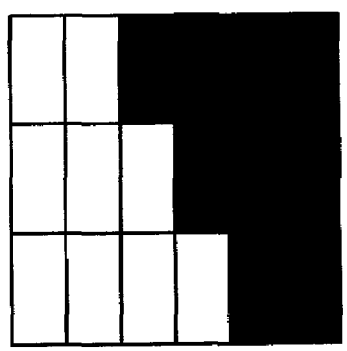
FIG. 35 shows an example of processing result (moved-rightward pattern) obtained at the main-scanning-directional second resolution converting section.
Figure 35B:
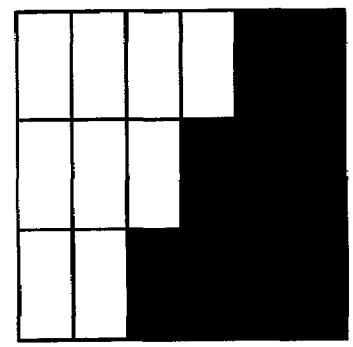

That is, in case the edge characteristic evaluating section 117 evaluates image patterns as "moved-leftward pattern", the resolution converting section 118 outputs image data having the highest gradation value among the image data for the pixels V32, V33, and V34 as the image data corresponding to the pixel W33A. As for the image data corresponding to the pixel W33B, the resolution converting section 118 outputs image data having the lowest gradation value among the image data for the pixels V32, V33, and V34. As a result, image data such as shown in FIGS. 34A, and 34B are obtained. On the other hand, in case the edge characteristic evaluating section 117 evaluates image patterns as "moved-rightward pattern", the resolution converting section 118 outputs image data having the lowest gradation value among the image data for the pixels v32, V33, and v34 as the image data corresponding to the pixel W33A. As the image data corresponding to the W33B, the resolution converting section 118 outputs image data having the highest gradation value among the image data for the pixels V32, V33, and V34. As a result, image data such as shown in FIGS. 35A, and 35B are obtained.

Let us revert to FIG. 30 again. The main-scanning-directional-image-data outputting section 116 selects either image data outputted from the main-scanning-directional first resolution converting section 114 or image data from the main-scanning-directional second resolution converting section 115. The image data selection depends on a discrimination result obtained by the main-scanning-directional region discriminating section 113. Specifically, as to pixels the main-scanning-directional region discriminating section 113 evaluates as edge region, the main-scanning-directional-image-data outputting section 116 selects image data outputted from the main-scanning-directional second resolution converting section 115. On the other hand, as to pixels the main-scanning-directional region discriminating section 113 evaluates as non-edge region, the main-scanning-directional-image-data outputting section 116 selects image data outputted from the main-scanning-directional first resolution converting section 114. Image data outputted from the main-scanning-directional-image-data outputting section 116 is inputted to an image data synthesizing section 19.

Figure 36:
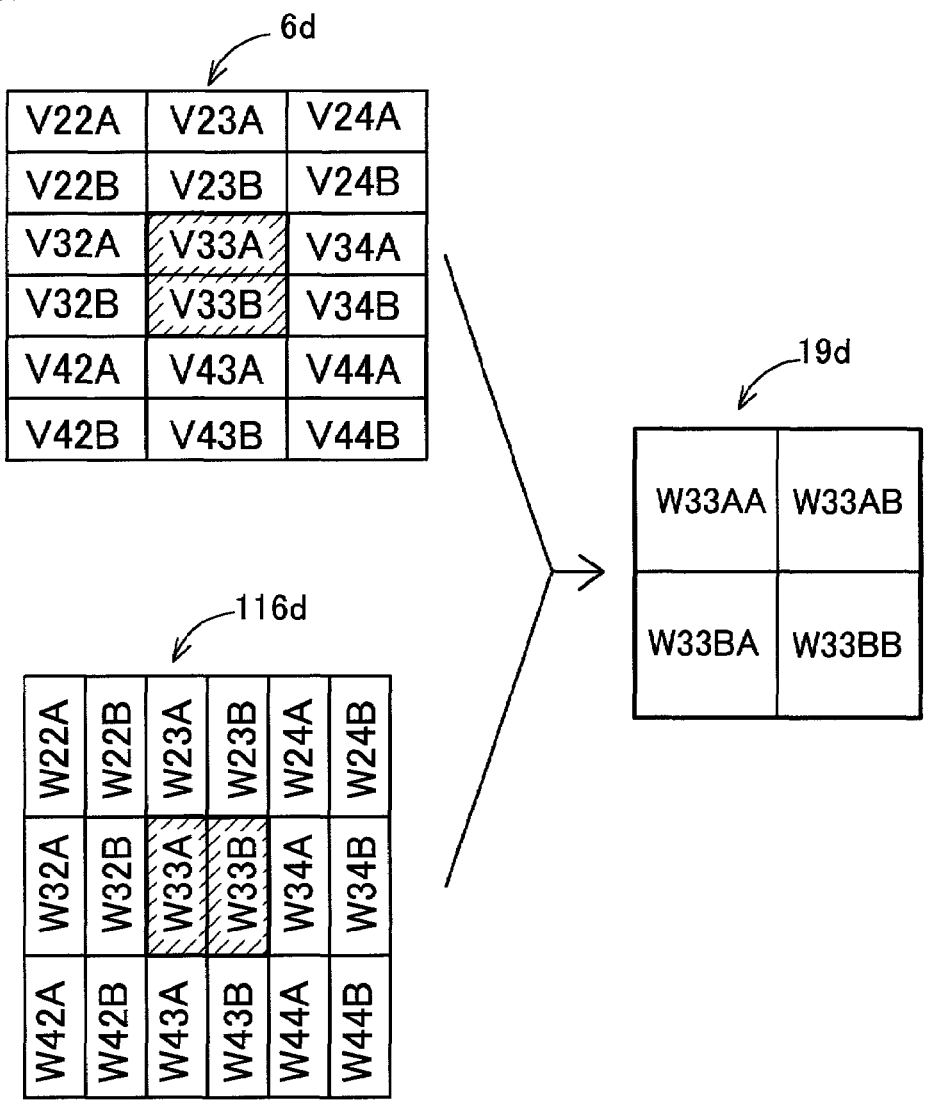
FIG. 36 shows an example of data structure after an image data synthesizing section applies synthesizing processing to image data.

The image data synthesizing section 19 synthesizes image data outputted from the sub-scanning-directional-image-data outputting section 6 and image data from the main-scanning-directional-image-data outputting section 116. For example, provided that a target pixel is V33, the image data synthesizing section 19 synthesizes data 6d (data with respect to pixels V33A and V33B outputted from the subscanning-directional-image-data outputting section 6) and data 116*d* (data with respect to pixels W33A and W33B outputted from the main-scanning-directional-image-data outputting section 116) as shown in FIG. 36. Thereby, data 19*d* which relates to pixels W33AA, W33AB, W33BA, and W33BB is obtained. Image data thus synthesized at the image data synthesizing section 19 corresponds to output data from the image processing apparatus 10.

Figure 37:
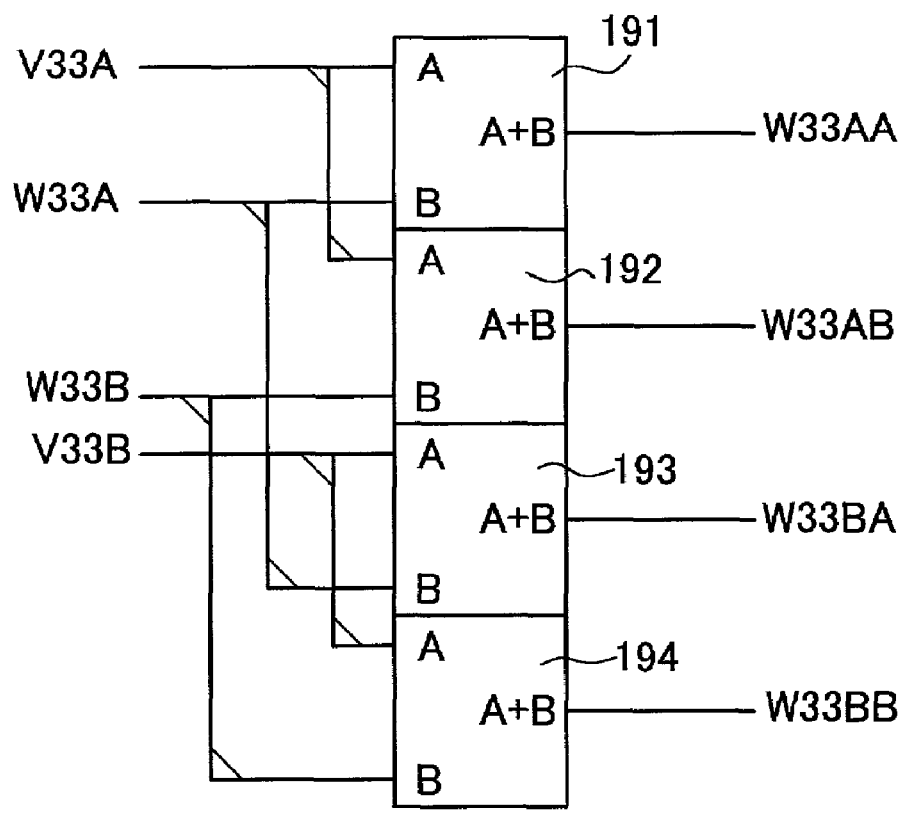
FIG. 37 shows the structure of the image data synthesizing section.

As shown in FIG. 37, the image data synthesizing section 19 is equipped with four adders 191, 192, 193, and 194. Each of the four adders consists of terminals A and B. Thereby, sums of (A+B) are outputted as arithmetic operation result.

Provided that a target pixel is V33, image data of a pixel V33A and that of a pixel W33A are inputted to the input terminal A and the input terminal B for the adder 191, respectively. As for the adder 192, image data of V33A and that of W33B are inputted to its input terminal A and input terminal B, respectively. As for the adder 193, image data of V33B and that of W33A are inputted to its input terminal A and input terminal B, respectively. As for the adder 194, image data of V33B and that of W33B are inputted to its input terminal A and input terminal B, respectively.

Accordingly, the adder 191 outputs a sum (V33A+W33A) which corresponds to image data of pixel W33AA. The adder 192 outputs a sum (V33A+W33B) which corresponds to image data of pixel W33AB. The adder 193 outputs a sum (V33B+W33A) which corresponds to image data of pixel W33BA. The adder 194 outputs a sum (V33B+W33B) which corresponds to image data of pixel W33BB.

Next, description will be given with respect to an image processing method of the image processing apparatus 10 structured such as the above. As an example of the method, a case of image processing of an original image shown in FIG. 24 will be described hereinafter.

Firstly, an original image is readout by a scanner or the like and image data obtained is inputted to the image processing apparatus 10. The image data inputted to the image processing apparatus 10 is converted into raster type data structure such as shown in FIG. 2 by the FIFO memory 2. The image data converted into raster type data structure is inputted to the sub-scanning-directional-region discriminating section 3, the sub-scanning-directional first resolution converting section 4, the sub-scanning-directional second resolution converting section 5, the main-scanning-directional-region discriminating section 113, the main-scanning-directional first resolution converting section 114, and the main-scanning-directional second resolution converting section 115, respectively. Image processing described below with respect to the sub-scanning direction and the main-scanning direction is conducted in parallel.

As for image processing with respect to the sub-scanning direction, the sub-scanning-directional-region discriminating section 3, the sub-scanning-directional first resolution converting section 4, the sub-scanning-directional second resolution converting section 5, and the sub-scanning-directional-image-data outputting section 6 work in the same manner as the First Embodiment. However, resultant image data (600×1200 dpi) processed by the above sections is outputted to the image data synthesizing section 19.

In parallel with the image processing for the sub-scanning direction, image processing with respect to the main-scanning direction is conducted. That is, the main-scanning-directional-region discriminating section 113 discriminates whether or not each pixels for the original image data belongs to edge region with respect to the main-scanning direction. On the other hand, the image data inputted to the main-scanning-directional first resolution converting section 114 is inputted to the main-scanning-directional-image-data outputting section 116 with its resolution being doubled in the main-scanning direction. Furthermore, for image data inputted to the main-scanning-directional second resolution converting section 115, the edge characteristic evaluating section 117 evaluates its edge characteristic. Specifically, in case its edge characteristic coincides with a predetermined pattern, it is evaluated as moved-leftward edge or moved-rightward edge. In case not coincide with the predetermined pattern, it is evaluated as normal edge. In accordance with an evaluation result obtained by the edge characteristic evaluating section 117, the resolution converting section 118 conducts resolution conversion processing to double the resolution of image data in the main-scanning direction. The image data processed by the resolution converting section 118 is inputted to the main-scanning-directional-image-data outputting section 116.

It should be noted that two kinds of image data have been inputted in the main-scanning-directional-image-data outputting section 116, so far. One of them is image data of the original image with its resolution doubled. The other one is image data of the original image resolution of which is doubled in accordance with an evaluation result of its edge characteristic. Resolution of these two type of image data is 1200×600 dpi. This is because resolution of these image data is doubled just in the main-scanning direction.

Next, the main-scanning-directional-image-data outputting section 116 selects either the image data outputted from the main-scanning-directional first resolution converting section 114 or the image data outputted from the main-scanning-directional second resolution converting section 115. Appropriate image data is selected in accordance with an evaluation result obtained by the main-scanning-directional-region discriminating section 113. Specifically, in case of a pixel evaluated as edge region by the main-scanning-directional-region discriminating section 113, image data to be outputted from the main-scanning-directional second resolution converting section 115 is selected by the main-scanning-directional-image-data outputting section 116. On the other hand, in case of a pixel evaluated as non-edge region by the main-scanning-directional-region discriminating section 113, image data to be outputted from the main-scanning-directional first resolution converting section 114 is selected. This is the process with respect to main-scanning direction. It is also the image data synthesizing section 19 that resultant image data (1200×600 dpi) processed by the above sections is outputted to.

Then, the image data synthesizing section 19 synthesizes image data outputted from the sub-scanning-directional-image-data outputting section 6 (600×1200 dpi) and image data from the main-scanning-directional-image-data outputting section 116 (1200×600 dpi). Thereby, image data of (1200×1200 dpi) can be obtained. The image data thus obtained by the image data synthesizing section 19 corresponds to an output from the image processing apparatus 10. The output from the image processing apparatus 10 is inputted to a printer or the like and an output image in high quality such as shown in FIG. 25 is formed. Moreover, resolution conversion processing is conducted for the main-scanning direction and the sub-scanning direction independently, however, processing speed does not speed down. This is because image processing with respect to the main-scanning direction and image processing with respect to the sub-scanning direction are conducted in parallel (simultaneously in substance).

As described, according to the image processing apparatus 10 of the Third Embodiment, the sub-scanning-directional first resolution converting section 4 and the sub-scanning-directional second resolution converting section 5 are provided so as to enhance resolution of image data with respect to the sub-scanning direction, and, the main-scanning-directional first resolution converting section 114 and the main-scanning-directional second resolution converting section 115 are provided so as to enhance resolution of image data with respect to the main-scanning direction. Thereby, since resolution conversion processing can be applied to the image data with respect to the sub-scanning direction and the main-scanning direction independently, a high-quality output image can be obtained. Moreover, total processing speed of the image processing apparatus 10 does not slow down. This is because image processing with respect to the main-scanning direction and image processing with respect to the sub-scanning direction are conducted in parallel.

Furthermore, in the image processing apparatus 10, as for a pixel evaluated as edge region by the sub-scanning-directional region discriminating section 3, image data, to which resolution conversion processing with respect to the sub-scanning direction is applied at the sub-scanning-directional second resolution converting section 5 based on the edge characteristic evaluation, is outputted from the sub-scanning-directional-image-data outputting section 6. Similarly, as for a pixel evaluated as edge region by the main-scanning-directional region discriminating section 113, image data, to which resolution conversion processing with respect to the main-scanning direction is applied at the main-scanning-directional second resolution converting section 115 based on the edge characteristic evaluation, is outputted from the main-scanning-directional-image-data outputting section 116. Then, image data outputted from the image data synthesizing section 19 corresponds to an output of the image processing apparatus 10. An appropriate manner of resolution conversion processing is changed depending on whether each pixel of image data belongs to edge region or not. As a result, image data, to which resolution conversion processing appropriate for characteristic of respective edge is applied, is outputted. Thereby, more high-quality output image can be obtained.

(Fourth Embodiment)

Next, a Fourth Embodiment will be described. An image processing apparatus directed to the Fourth Embodiment is intended to obtain effects the same as the Third Embodiment with a simpler structure. It is intended to obtain a high-quality output image even for the case of an image consisting of picture region and character region.

Figure 38:
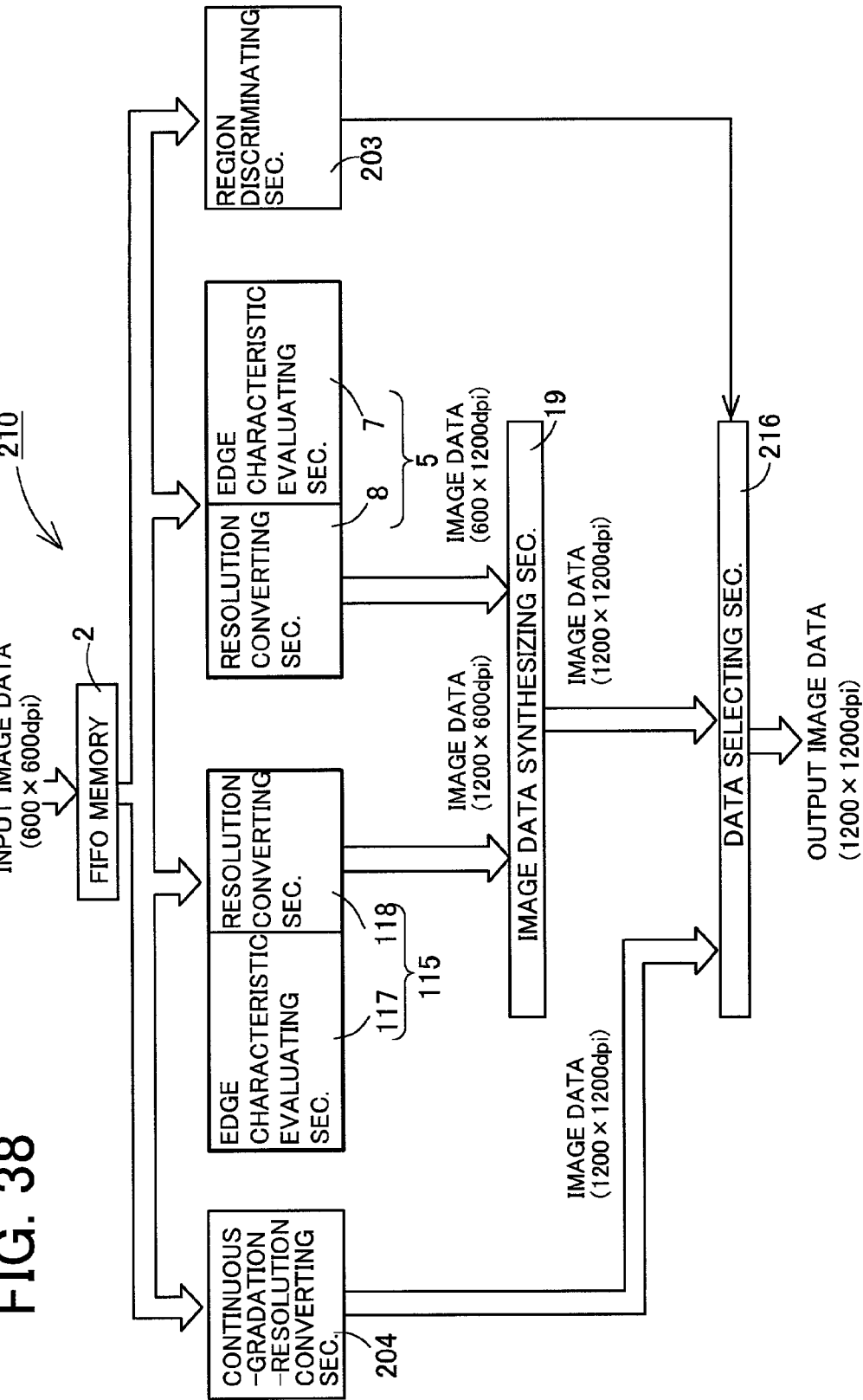
FIG. 38 shows a block diagram schematically showing the structure of an image processing apparatus directed to a Fourth Embodiment.

That is, as shown in FIG. 38, an image processing apparatus 210 includes: an FIFO memory 2, a sub-scanning-directional second resolution converting section 5 including an edge characteristic evaluating section 7, and a resolution converting section 8; a main-scanning-directional second resolution converting section 115 including an edge characteristic evaluating section 117, and a resolution converting section 118; an image data synthesizing section 19; a region discriminating section 203; a continuous-gradation-resolution converting section 204; and a data selecting section 216.

Compared with the image processing apparatus 10 directed to the Third Embodiment, there are not employed a sub-scanning-directional region discriminating section 3, a sub-scanning-directional first resolution converting section 4, a sub-scanning-directional-image-data outputting section 6, a main-scanning-directional-region discriminating section 113, a main-scanning-directional first resolution converting section 114, and a main-scanning-directional-image-data outputting section 116 for the image processing apparatus 210. Instead, newly added thereto are the region discriminating section 203, the continuous-gradation-resolution converting section 204, and the data selecting section 216. In this embodiment, as for processing sections structured similar to those of forgoing embodiments, the same numerals are assigned thereto and descriptions for the identical sections will be omitted. Aspects different from the forgoing embodiments will be mainly described hereinafter.

The region discriminating section 203 is structured such as shown in FIG. 27, thereby to discriminate whether each pixel of an original image belongs to edge region or continuous gradation region. Discrimination size is 5×5 dots. The continuous-gradation-resolution converting section 204 structured such as shown in FIG. 28 makes resolution of the image data double with respect to both the main-scanning direction and the sub scanning direction.

The data selecting section 216 selects either image data outputted from the image synthesizing section 19 or image data from the continuous-gradation-resolution converting section 204. Appropriate data is selected in accordance with a discrimination result made by the region discriminating section 203. Specifically, in case of a pixel evaluated as edge region by the region discriminating section 203, image data to be outputted from the image synthesizing section 19 is selected. On the other hand, in case of a pixel evaluated as continuous gradation region by the region discriminating section 203, image data to be outputted from the continuous-gradation-resolution converting section 204 is selected. Image data outputted from the data selecting section 216 is inputted to a printer or the like as output image data and thereby, an output image is formed on paper or the like.

Next, description will be given with respect to an image processing method of the image processing apparatus 210 structured such as above. Resolution of an image data is 600×600 dpi.

Firstly, an original image is readout by a scanner or the like and image data obtained is inputted to the image processing apparatus 210. The image data inputted to the image processing apparatus 210 is converted into raster type data structure such as shown in FIG. 2 by the FIFO memory 2. The image data converted into raster type data structure is inputted to the sub-scanning-directional-region second resolution converting section 5, the main-scanning-directional-region second resolution converting section 115, the region discriminating section 203, and the continuous-gradation-resolution discriminating section 204, respectively.

Processing similar to the Third Embodiment is applied to image data inputted to the sub-scanning-directional-region second resolution converting section 5 and image data to the main-scanning-directional-region second resolution converting section 115 and theirs resultant image data (1200× 1200 dpi) outputted from the image data synthesizing section are inputted to the image data selecting section 216.

Processing to make resolution of image data double with respect to both the main-scanning direction and the sub scanning direction is applied to the image data inputted to the continuous-gradation-resolution converting section 204. The image data (1200×1200 dpi) resolution of which is doubled by the continuous-gradation-resolution converting section 204 is inputted to the image data selecting section 216.

On the other hand, the region discriminating section 203 discriminates whether each pixel of the input image data belongs to edge region or continuous gradation region. A discrimination result obtained at the region discriminating section 203 is inputted to the image data selecting section 216.

The image data selecting section 216 selects either image data outputted from the image data synthesizing section 19 or image data from the continuous-gradation-resolution converting section 204. Appropriate image data is selected in accordance with an evaluation result obtained by the region discriminating section 203. Specifically, in case of a pixel evaluated as edge region by the region discriminating section 203, image data to be outputted from the image data synthesizing section 19 is selected. On the other hand, in case of a pixel evaluated as continuous gradation region by the region discriminating section 203, image data to be outputted from the continuous-gradation-resolution converting section 204 is selected. Image data selected by the image data selecting section 216 corresponds to output data of the image processing apparatus 210. The output data from the image processing apparatus 210 is inputted to a printer or the like to form an output image.

Since the image processing apparatus 210 directed to the Fourth Embodiment is equipped with the region discriminating section 203, the continuous-gradation-resolution converting section 204, and the image data selecting section 216, effects similar to the Third Embodiment can be obtained with such simpler structure. Furthermore, among input image data, a pixels belonging to continuous gradation region can receive resolution conversion processing different from resolution converting processing applied to a pixel belonging to edge region. Therefore, with respect to both a picture image and a character image, a high-quality output image with high resolution can be obtained similar to the Second Embodiment. Furthermore, since a plurality of various processing for input image data is conducted in parallel (simultaneously in substance), processing speed does not slow down.

As described, according to the image processing apparatus 210 of the Fourth Embodiment, the sub-scanning-directional second resolution converting section 5 and the main-scanning-directional second resolution converting section 115 are provided so as to enhance resolution of image data with respect to the sub-scanning direction and the main-scanning direction, respectively. Thereby, since resolution conversion processing can be applied to the image data with respect to the sub-scanning direction and the main-scanning direction independently, a high-quality output image can be obtained.

Furthermore, the image processing apparatus 210 is equipped with the region discriminating section 203 and the continuous-gradation-resolution converting section 204 and the image data selecting section 216. Thereby, the structure of the apparatus is more simplified and among input image data, a pixel belonging to continuous gradation region can receive resolution conversion processing different from resolution conversion processing applied to a pixel belonging to edge region. Accordingly, even for the case of image data consisting of picture image and character image, a high-quality output image can be obtained.

Still further, in the image processing apparatus 210, data processing at the sub-scanning-directional second resolution converting section 5, data processing at the main-scanning-directional second resolution converting section 115, data processing at the continuous-gradation-resolution converting section 204 and discrimination processing at the region discriminating section 203 are conducted in parallel (simultaneously in substance). Therefore, processing speed does not slow down.

It would be understood that the present invention is not limited to the above described embodiments which is illustrative and various modification and changes may be made without departing from the scope of the present invention. For example, in the First and Second Embodiment, resolution conversion processing for a main-scanning direction is conducted after resolution conversion processing for a sub-scanning direction. However, resolution conversion processing for a main-scanning direction may be conducted prior to resolution conversion processing for a sub-scanning direction.

What is claimed is:

1. An image processing apparatus comprising:
a first resolution converter for conducting resolution conversion of image data with respect to a sub-scanning direction; and
a second resolution converter for conducting resolution conversion of image data outputted by the first resolution converter with respect to a main-scanning direction crossing the sub-scanning direction;
at least one of the first resolution converter and the second resolution converter conducts resolution conversion of image data according to an edge characteristic of each pixel of image data.

2. An image processing apparatus comprising:
a first resolution converter for conducting resolution conversion of image data with respect to a sub-scanning direction; and
a second resolution converter for conducting resolution conversion of image data outputted by the first resolution converter with respect to a main-scanning direction crossing the sub-scanning direction, wherein the first resolution converter comprises:
a first sub-scanning direction resolution converting section;
a second sub-scanning direction resolution converting section; and
a first region discriminating section for discriminating whether or not each pixel of image data belongs to edge region with respect to the sub-scanning direction; and
the first resolution converter selects and outputs one of the outputs obtained from the first and second sub-scanning direction resolution converting sections based on a discrimination result obtained by the first region discriminating section.

3. An image processing apparatus according to claim 2, wherein the second sub-scanning direction resolution converting section comprises a first edge characteristic evaluating section for evaluating edge characteristic with respect to the sub-scanning direction, and resolution conversion with respect to the sub-scanning direction is conducted in accordance with an evaluation result obtained by the first edge characteristic evaluating section.

4. An image processing apparatus comprising:
a first resolution converter for conducting resolution conversion of image data with respect to a sub-scanning direction; and
a second resolution converter for conducting resolution conversion of image data outputted by the first resolution converter with respect to a main-scanning direction crossing the sub-scanning direction, wherein the second resolution converter comprises:
a first main-scanning direction resolution converting section;
a second main-scanning direction resolution converting section; and a second region discriminating section for discriminating whether or not each pixel of image data belongs to edge region with respect to the main-scanning direction; and the second resolution converter selects and outputs one of the outputs obtained from the first and second main-scanning direction resolution converting sections based on a discrimination result obtained by the first region discriminating section.

5. An image processing apparatus according to claim 4, wherein the second main-scanning direction resolution converting section comprises a second edge characteristic evaluating section for evaluating edge characteristic with respect to the main-scanning direction, and resolution conversion with respect to the main-scanning direction is conducted in accordance with an evaluation result obtained by the second edge characteristic evaluating section.

6. An image processing apparatus comprising:

a first resolution converter for conducting resolution conversion of image data with respect to a sub-scanning direction; and a second resolution converter for conducting resolution conversion of image data outputted by the first resolution converter with respect to a main-scanning direction crossing the sub-scanning direction;

a third resolution converter for conducting resolution conversion with respect to both the main and sub-scanning directions of image data; and a third region discriminating section for discriminating whether or not each pixel of image data belongs to gradation image region;

wherein the image processing apparatus selects either an output of the second resolution converter or that of the third resolution converter in accordance with a discrimination result obtained by the third region discriminating section.

7. An image processing apparatus according to claim 1, wherein the at least one of the first and second resolution converters includes a resolution converting section which evaluates edge characteristic and conducts resolution conversion in accordance with an evaluation result obtained.

8. An image processing method comprising:

a step of converting resolution with respect to a sub-scanning direction for image data; and a step of converting resolution with respect to a main-scanning direction for image data which is after resolution conversion with respect to the sub-scanning direction;

at least one of the step of converting resolution with respect to a sub-scanning direction and the step of converting resolution with respect to a main-scanning direction being done according to an edge characteristic of each pixel of image data.

9. An image processing apparatus comprising:

a first resolution converter for conducting resolution conversion of image data with respect to a first scanning direction;

a second resolution converter for conducting resolution conversion of image data with respect to a second scanning direction crossing the first scanning direction separately from the first resolution converter; and an image data synthesizer for synthesizing output data of the first resolution converter and that of the second resolution converter;

at least one of the first resolution converter and the second resolution converter conduct resolution conversion of image data according to an edge characteristic of each pixel of image data.

10. An image processing apparatus comprising, a first resolution converter for conducting resolution conversion of image data with respect to a first scanning direction;

a second resolution converter for conducting resolution conversion of image data with respect to a second scanning direction crossing the first scanning direction separately from the first resolution converter; and an image data synthesizer for synthesizing output data of the first resolution converter and that of the second resolution converter;

wherein the first resolution converter comprises:

a first resolution converting section;

a second resolution converting section; and a first region discriminating section for discriminating whether or not each pixel of image data belongs to the edge region with respect to the first scanning direction; and the first resolution converter selects and outputs one of the outputs obtained from the first and second resolution converting sections based on a discrimination result obtained by the first region discriminating section.

11. An image processing apparatus according to claim 10, wherein the second resolution converting section comprises a first edge characteristic evaluating section for evaluating edge characteristic with respect to the first scanning direction, and resolution conversion with respect to the first scanning direction is conducted in accordance with an evaluation result obtained by the first edge characteristic evaluating section.

12. An image processing apparatus comprising, a first resolution converter for conducting resolution conversion of image data with respect to a first scanning direction;

a second resolution converter for conducting resolution conversion of image data with respect to a second scanning direction crossing the first scanning direction separately from the first resolution converter; and an image data synthesizer for synthesizing output data of the first resolution converter and that of the second resolution converter;

wherein the second resolution converter comprises:

a third resolution converting section;

a fourth resolution converting section; and a second region discriminating section for discriminating whether or not each pixel of image data belongs to edge region with respect to the second scanning direction; and the second resolution converter selects and outputs one of the outputs obtained from the third and fourth resolution converting sections based on a discrimination result obtained by the second region discriminating section.

13. An image processing apparatus according to claim 12, wherein the fourth resolution converting section comprises a second edge characteristic evaluating section for evaluating edge characteristic with respect to the second scanning direction, and resolution conversion with respect to the second scanning direction is conducted in accordance with an evaluation result obtained by the second edge characteristic evaluating section.

14. An image processing apparatus comprising: a first resolution converter for conducting resolution conversion of image data with respect to a first scanning direction;

a second resolution converter for conducting resolution conversion of image data with respect to a second scanning direction crossing the first scanning direction separately from the first resolution converter; and an image data synthesizer for synthesizing output data of the first resolution converter and that of the second resolution converter;

a third resolution converter for conducting resolution conversion with respect to both the first and second scanning directions of image data; and a third region discriminating section for discriminating whether or not each pixel of image data belongs to gradation image region;

wherein the image processing apparatus selects either an output of the image data synthesizer or that of the third resolution converter in accordance with a discrimination result obtained by the third region discriminating section.

15. An image processing apparatus according to claim 9, wherein at least one of the first and second resolution converters includes a resolution converting section which evaluates edge characteristic and conducts resolution conversion in accordance with an evaluation result obtained.

16. An image processing method comprising:

a step that resolution conversion with respect to a first scanning direction according to an edge characteristic of each pixel of image data and resolution conversion with respect to a second scanning direction according to an edge characteristic of each pixel of image data crossing the first scanning direction are conducted for image data independently; and a step that the image data with its resolution converted with respect to the first scanning direction and the image data with its resolution converted with respect to the second scanning direction are synthesized and outputted as synthesized image data.

17. An image processing apparatus according to claim 1, wherein both the first and second resolution converters include a resolution converting section which evaluates edge characteristic and conducts resolution conversion in accordance with an evaluation result obtained.

18. An image processing method according to claim 8, wherein both the step of converting resolution with respect to a sub-scanning direction and the step of converting resolution with respect to a main-scanning direction is done according to an edge characteristic of each pixel of image data.

19. An edge processing apparatus according to claim 9, wherein both the first resolution converter and the second resolution converter conduct resolution conversion of image data according to an edge characteristic of each pixel of image data.

* * * * *